US007282189B2

(12) United States Patent
Zauderer

(10) Patent No.: US 7,282,189 B2
(45) Date of Patent: Oct. 16, 2007

(54) PRODUCTION OF HYDROGEN AND REMOVAL AND SEQUESTRATION OF CARBON DIOXIDE FROM COAL-FIRED FURNACES AND BOILERS

(76) Inventor: Bert Zauderer, 275 N. Highland Ave., Merion Station, PA (US) 19066

( * ) Notice: Subject to any disclaimer, the term of this patent is extended or adjusted under 35 U.S.C. 154(b) by 624 days.

(21) Appl. No.: 10/820,065

(22) Filed: Apr. 8, 2004

(65) Prior Publication Data

US 2004/0200393 A1 Oct. 14, 2004

Related U.S. Application Data

(60) Provisional application No. 60/461,140, filed on Apr. 9, 2003.

(51) Int. Cl.
*B01D 53/34* (2006.01)
*B01D 53/62* (2006.01)
*C01B 3/02* (2006.01)

(52) U.S. Cl. .................. 423/220; 423/210; 423/235; 423/242.1; 423/245.1; 423/225; 423/230; 423/648.1; 423/650; 423/651; 48/61; 48/77; 110/218; 431/2

(58) Field of Classification Search ................ 423/210, 423/235, 242.1, 245.1, 220, 225, 230, 648.1, 423/650, 651; 48/61, 77; 431/2; 110/218
See application file for complete search history.

(56) References Cited

U.S. PATENT DOCUMENTS

| | | | | |
|---|---|---|---|---|
| 6,669,917 | B2 * | 12/2003 | Lyon ..................... | 423/437.1 |
| 7,083,658 | B2 * | 8/2006 | Andrus, Jr. et al. ......... | 48/101 |
| 2003/0029088 | A1 * | 2/2003 | Lyon ...................... | 48/77 |
| 2004/0001788 | A1 * | 1/2004 | Marin et al. .............. | 423/210 |
| 2004/0126293 | A1 * | 7/2004 | Geerlings et al. .......... | 423/228 |
| 2006/0048517 | A1 * | 3/2006 | Fradette et al. ............ | 60/772 |
| 2006/0185985 | A1 * | 8/2006 | Jones ..................... | 205/508 |

OTHER PUBLICATIONS

Emissions of Greenhouse Gasses in the United States 2003, Feb. 2005.
Reconstructing Climatic And Environmental Changes Of the Past 1000 Years: A Reappraisal, p. 233, Willie Soon et al.
Report in Brief "Abrupt Climate Change: Inevitable Surprises", The National Academies, Copyright 2004, (publication date unknown).
Climate Change Science, An Analysis of Some Key Questions, (Author unknown), National Academy Press, Washington D.C.
Carbon Dioxide Disposal In Minerals From Keeping Coal Competitive, Klaus S. Lackner et al., Los Alamos National Laboratory, Nov. 1997.
Climate Change Prediction Program, website: http://www.sc.doe.gov/ober/CCRD/model.html (publication date unknown).
The Kyoto Protocol is a Hot Issue; by Francis Dietz, Mechanical engineering: Washington window, Copyright Jun. 1999 (Publication date unknown).
"Why not a 40-mpg SUV? Technologies that would curb gas-guzzling by sport-utility vehicles are well advanced in the lab. Just don't bother looking for them at your local dealer anytime soon.", Technology Review (Cambridge, Mass), Nov. 2002, by Mark Fischetti.
Form EIA-860A Database, Annual Electric Generator Report—Utility, (publication date unknown).
Analysis of Strategies for Reducing Multiple Emissions from Power Plants: Sulfur Dioxide, Nitrogen Oxides, and Carbon Dioxide, Dec. 2000, Energy Information Administration; Office of Integrated Analysis and Forecasting U.S. Department of Energy, Washington D.C.
Carbon Sequestration; Technology Roadmap and Program Plan, Mar. 2, 2003, 1 U.S. DOE Office of Fossil Energy National Energy Technology Laboratory, p. 5.
Carbon Sequestration; State of the Science; A working paper for roadmapping future carbon sequestration R&D, Feb. 1999, (publication date unknown).
Technical Progress in the Development of Zero Emission Coal Technologies, H.-J. Ziok et al., p. 1, 3 and 4.
Introductory College Chemistry, Second Edition, Joseph A. Babor and Alexander Lehrman, Thomas Y. Crowell Company, New York 1950, p. 248, 249 and 659.
Renewable Energy; Sources for Fuels and Electricity, Island Press, pp. 747 and table 4.
Volume II—Technical Application; CoalTech Corp. Solicitation No. DE—PS26-02NT41422-3, Novel Hybrid Gasification/Combustion Combined Gas/Vapor Turbine Cycles with Coal/Biomass; Feb. 3, 2002, pp. 1-4.
Feasibility of Corn Residue Collection in Kearney, Nebraska Area; Report of Findings; Apr. 1993; Renee Sayler et al.
$H^2$ RV-Ford Hydrogen Hybrid Research Vehicle: A Bridge To A Hydrogen-Fueled Future; Ford Motor Company—Press Release, Shanghai, Oct. 13, (year unknown), pp. 1-3.

* cited by examiner

*Primary Examiner*—Timothy C. Vanoy
(74) *Attorney, Agent, or Firm*—Greenblum & Bernstein, P.L.C.

(57) ABSTRACT

Methods for reducing and eliminating carbon dioxide from the emissions of solid fuel fired power plants, particularly coal fired power plants, and to sequester the carbon dioxide, typically by using existing equipment. In some embodiments, the methods involve pyrolyzing the solid fuel to remove volatile matter and using the volatile matter to produce hydrogen. Additionally, the methods may involve burning the solid fuel or pyrolized solid fuel at very fuel rich stoichiometric conditions. Sequestration may include the production of a carbon dioxide-containing solution and the pumping of the solution into the ground, particularly in areas high in limestone.

20 Claims, 4 Drawing Sheets

PRODUCTION OF HYDROGEN AND REMOVAL AND SEQUESTRATION OF CARBON DIOXIDE FROM COAL-FIRED FURNACES AND BOILERS

CROSS-REFERENCE TO RELATED APPLICATIONS

This application claims priority to U.S. Provisional Application No. 60/461,140, filed on Apr. 9, 2003, the contents of which are incorporated by reference in their entirety.

BACKGROUND OF THE INVENTION

1. Field of the Invention

The present invention relates to methods for producing hydrogen and for removing and sequestering carbon dioxide ($CO_2$) from coal-fired furnaces and boilers.

2. Description of Related Art

Carbon dioxide ($CO_2$), one of the so-called greenhouse gases, is produced during the combustion of fossil fuels, especially coal, in furnaces and power plants. Recent scientific studies have shown that emissions of $CO_2$ and other greenhouse gases, which include methane ($CH_4$), sulfur dioxide ($SO_2$), and nitrogen oxides ($NO_x$), can have a significant effect on climate change. The prospect of climate change caused, at least in part, by emission of $CO_2$ and other greenhouse gases has led to international concern and to international treaties, such as the Kyoto Protocol. At the time of writing, the Kyoto Protocol has been approved but has not gone into effect because of some international resistance.

The Kyoto Protocol specifies that the industrialized nations of the world are to reduce $CO_2$ emissions to 7% below 1990 levels. In addition to that requirement, the Kyoto Protocol allows "emission trading," under which countries with higher emission levels of greenhouse gases can buy "emission credits" from countries that are not emitting their allotted levels of greenhouse gases. Various "emission trading" schemes have also been in use within the United States for some time.

Because of the national and international concern, power producers have been attempting to reduce the levels of $CO_2$ produced by power plants, particularly coal-fired power plants. Many newer power plants are combined cycle plants fired by natural gas, which produce significantly less $CO_2$. However, because of the relative abundance of coal in the United States and the fact that there have been significant construction delays in building new gas fired power plants, methods to reduce the emission of coal-fired plants are needed.

Some methods have been proposed for sequestering the $CO_2$ produced by coal fired and other power plants. One method for $CO_2$ sequestration involves reacting the $CO_2$ with large quantities of metal oxides, particularly calcium oxide and magnesium oxide, then burying the resulting carbonates. This method requires a large and continuous supply of minerals in order to sequester $CO_2$. Another proposed method involves removing the $CO_2$ from the combustion gas at the power plant, compressing it, shipping it by pipeline to a peridotite or serpentinite mine for conversion to a carbonate, and then burying it at the mine site. However, shipment of compressed $CO_2$ may be a materials handling problem, because $CO_2$, which is heavier than air, will stay close to the ground if it is accidentally released during transit, and can thus pose a danger to life. Additionally, availability of mines may be a problem. Other methods involve compression of $CO_2$ and injection into the sea.

In general, these methods for sequestering $CO_2$ do not take into account the overall efficiency of the power plant, which may be reduced by up to 30% if they are implemented, nor do they take into account certain economic considerations. In order for a method for reducing $CO_2$ emissions to be desirable, it should be lower in cost, and it should not damage the interests of current power stakeholders, or it may be blocked from implementation.

Some work has been done on new power cycles for coal power plants. For example, a zero emissions coal fired power plant can incorporate the above-described mineral sequestration method for $CO_2$ with a different power cycle. It consists of a coal gasification step that produces $CH_4$, $H_2$, and $CO_2$, followed by a carbonation step that uses $CH_4$ and $H_2$ and uses CaO to capture the $CO_2$. The hydrogen "fires" a fuel cell. The $CO_2$ is sequestered either by the mineral process or by injection in other geologic sites, such as depleted oil wells or coalmines or saline aquifers or the ocean. The CaO is calcined from mined mineral. However, one of the key technical development issues with this proposed method is a fuel cell that is tolerant of sulfur compounds released by the coal gasification, and, as such, the fuel cell may be more difficult to develop than fuel cells fired with methane, i.e., natural gas (although natural gas also contains minute quantities of sulfur). Another issue is the possibility of inefficient heat transfer between many steps in this complex system, which may sharply reduce the feasibility of this cycle. Additionally, since no large central station power plants with methane fuel cells are in existence, the probability of developing even a full scale prototype plant for this much more complicated coal fired system in the near future is very small, and the possibility of building enough power plants of this type to meaningfully reduce $CO_2$ emissions is even smaller.

SUMMARY OF THE INVENTION

The invention relates to methods for removing carbon dioxide emissions from coal fired power plants. One method comprises operating a primary combustor in a furnace or boiler of the power plant to combust the solid fuel under fuel rich conditions at stoichiometric ratios in the range of 0.60 to 0.80, which results in unburned carbon mixed with ash, i.e. char, in the products of combustion that is collected in particle collection equipment upstream of the power plant stack. Since fuel rich combustion operation increases the rate of metal tube wastage from corrosion by sulfur dioxide in the combustion gases, a novel, low-cost, post-combustion sulfur dioxide reduction process is included with this method. The unburned char is temporarily stored at the power plant site for future combustion and sequestration of the carbon dioxide or it is shipped to a site more suitable for future combustion and sequestration of the carbon dioxide. The benefit of this approach is that the carbon dioxide emissions are immediately reduced. The electricity production lost by temporary storage of the carbon is replaced by power plants fired with natural gas, or waste heat or biomass, all of which have lower carbon dioxide emissions than coal. Since these substitute fuels are more costly than coal, part of the added cost can be recovered by the sale of emission rights for nitrogen oxides, which are reduced with increasing fuel rich combustion. To maximize the value of nitrogen oxide emission rights, post-combustion nitrogen oxide reduction processes are added.

Assuming 20% of the coal carbon is stored temporarily and using recent prices for the various fuels and for nitrogen oxide emission rights, the estimated cost of this temporary carbon removal method ranges from $8.53 per short ton to $35 per short ton of carbon dioxide removed, depending on the fuel replacement method used. This compares with Department of Energy estimates of $30 per ton to $50 per ton of carbon dioxide. This temporary carbon reduction method would increase the price of the average U.S. electricity to consumers by 0.95% to 3.7%. Furthermore, assuming the introduction of the sale of carbon emission credits at a price that is 50% of the value of $50 per ton assigned by Norway and Sweden, the carbon removal cost would be further reduced to the range of $1.2 per short ton to $28 per short ton of carbon dioxide removed.

This method can be implemented little to no modifications to the equipment in existing coal fired power plants, and operation at more fuel rich conditions. If implemented to all U.S. coal fired power plants, it would have met almost the entire percentage contribution of coal-fired power plants to total U.S. carbon dioxide emissions in 1999 toward meeting the Kyoto Protocol of reducing said emissions by 7% below 1990 levels.

All of the contribution toward meeting Kyoto could have been met with another method disclosed in this invention by offsetting part of the electricity lost from carbon storage with agricultural residue in distributed small power plants in the range of 1 to 20 MW that are located near harvest regions. The volatile matter in this residue is used for hydrogen production, and the remaining char is used in these small power plants. Here the estimated cost of replacement is $11.7 per short ton without a carbon credit and $5.55 per short ton of carbon dioxide removed with a carbon credit.

The future combustion, pollutant removal, carbon dioxide separation, and carbon dioxide sequestration methods for the stored carbon-ash mixture is identical with that used in second method for carbon dioxide removal disclosed in this invention.

The second method disclosed in this invention permanently removes carbon dioxide emissions from coal combustion by sequestering the carbon dioxide in geologic formations. In this second method the entire coal utilization from combustion to carbon dioxide sequestration is implemented preferably at the power plant site. Alternatively, the char can be shipped to a site with more favorable geologic conditions for combustion in the char fired boiler system, carbon dioxide separation and sequestration.

Another alternative, which is applicable to power plant sites with limited water supply is to separate the carbon dioxide at the plant and transport it to the nearest suitable underground sequestration site. The first step in this second method is to use a pyrolizer that is indirectly heated by the hot carbon dioxide-nitrogen gases released from a limestone calciner vessel and is also directly heated and compressed with 150 psi steam drawn from the steam turbine in the char fired boiler. The pyrolizer separates all volatile matter in the coal, which consists of hydrogen, hydrogen-carbon compounds, and other volatile carbon compounds. The carbon-based volatiles are converted to hydrogen by reaction with pressurized steam and calcium oxide to yield hydrogen and calcium carbonate. The calcium carbonate is recycled to a char fired calciner vessel to produce calcium oxide. The hydrogen is the cleaned in a sand filter and either used to generate power in a combined gas turbine/steam turbine power plant, or it is compressed for sale as a transportation fuel or chemical process feedstock.

The balance of the coal, namely the char, is preferably burned in an air-cooled, slagging combustor that is attached to the existing or new coal fired steam boiler. Due to the removal of the volatile matter from the coal, the total coal flow to the plant is increased to the point where the heat input from the char equals that of the original coal heat input. In consequence the combination of the hydrogen fired new power cycle and the existing char fired steam cycle results in about doubling the power output of the original power plant.

The combustion products from the solid char are processed inside the slagging combustor and in the post-combustion zones in the boiler to remove pollutants such as sulfur dioxide, nitrogen oxides, and volatile trace metals in ash. The remaining combustion gases, consisting of carbon dioxide and nitrogen, are compressed to high pressure and mixed with water to dissolve the carbon dioxide and form hydrogen carbonate, which is injected deep underground to mix with limestone deposits and form liquid calcium-hydrogen-carbonate. Prior to underground injection, the high-pressure nitrogen gas is separated and expanded in a gas turbine-electric generator to recover much of the gas compression energy, and exhausted into the atmosphere. The pipe for injecting the carbon dioxide-water solution is inserted to a depth at which its underground outlet is at a sufficiently high pressure to react with natural limestone deposits to form the calcium-hydrogen-carbonate solution.

On-site sequestration in the earth beneath existing power plants is the preferred method for carbon dioxide removal, which should be possible at most sites because limestone deposits are widely dispersed in the Earth as they constitute about 2% of the Earth's crust. If the geology of the site of a coal fired power plant is unsuitable for sequestration in the ground, such as would be the case if no limestone deposits exists deep underneath the potable water strata, or the existing boiler site has inadequate water supply, such as in arid regions, the residual char, consisting of carbon and ash, would be shipped to other existing or new suitable sites for combustion and sequestration, as is the case in the first method.

In one embodiment of this invention, which could be practiced in regions with limited water supplies, CaO particles at about 1292° F. remove the $CO_2$ by injection in the boiler furnace, downstream of the $SO_2$ and $NO_x$ removal steps, to form $CaCO_3$. The $CaCO_3$ is then heated in a separate calcining vessel to about 1700° F. to re-evolve the $CO_2$. The $CO_2$ gas is then compressed to a level sufficient to inject it into a geologic formation, such as a spent coalmine, spent gas well, or saline formation or the $CO_2$ could be injected into the ocean. This procedure is possible because by burning char only the partial pressure of $CO_2$ in the combustion products at atmospheric pressure is about 160 mm of Hg, which is substantially higher than its concentration with coal combustion. This corresponds to an equilibrium temperature for decomposition of $CaCO_3$ of 168 mm of Hg is 800° C. (1472° F.). This means that CaO particles that are injected into the combustion gases at a temperature of about 700° C., where the equilibrium partial pressure of $CO_2$ is 25 mm of Hg, will react with the CaO to form the carbonate. $CaCO_3$ particles heated to at least 1700° F. (923° C.) will calcine to CaO and release $CO_2$ gas at 1 atmosphere or above. Therefore, the calciner is recycled between 1290° F. and 1700° F. in order to allow continued use of the same limestone, which essentially eliminates the need for extensive mining and shipping operation of limestone to the power plant.

BRIEF DESCRIPTION OF THE DRAWINGS

The invention will be described with respect to the following drawings, in which.

DETAILED DESCRIPTION

The invention has several aspects and provides methods and apparatuses that, when used alone or in combination, may significantly reduce or eliminate carbon dioxide ($CO_2$) emissions from power plants that burn solid fuels, particularly coal-fired power plants. The features of methods for reducing $CO_2$ emissions according to the invention may be used in various combinations with one another and include both temporary storage methods and more permanent sequestration methods. As will be described below in more detail, embodiments of the invention also provide for hydrogen production.

One temporary storage method comprises burning coal in the existing combustors of furnaces or boilers under fuel rich conductions so that the volatile matter in the coal and as much of the fixed solid carbon in the coal particles as desired are burned while the balance of the solid carbon remains unburned and passes out of the combustion zone of the furnaces or boilers with the fly ash. The carbon is captured in the stack particulate electrostatic precipitators (ESP), or the baghouse fabric filter (BFF). The amount of unburned carbon increases with increasing reduction in the combustion stoichiometry. For example, based on tests conducted by the inventor in a slagging cyclone combustor, about 20% of the carbon in the coal remains unburned at a fuel rich stoichiometric ratio in the combustion zone (SR1) of about 0.7 which equates to 30% oxygen deficiency. However, SR1 may be in the range of about 0.55 to about 0.8 or lower, depending on the particular configuration.

Certain prior work by the inventor and by others has shown that reducing SR1 can have beneficial effects on $NO_x$ emissions, but none of this prior work suggests specifically reducing SR1 to reduce carbon emission. In general, the prior work focused on eliminating unburned carbon while reducing $NO_x$ emissions as much as possible. For example, previous work by the inventor involving numerous tests in an air-cooled slagging combustor rated at 1 MMBtu/hour, in a 7 MMBtu/hour water-cooled slagging combustor, and finally in a 20 MMBtu/hour air-cooled, slagging combustor showed that $NO_x$ could be reduced by up to about two-thirds by operating these combustors at an SR1 in the range of 0.65 to 0.8. However, the $NO_x$ reduction decreased as SR1 increased above 0.8. U.S. Pat. Nos. 4,624,191, 4,765,258, 6,048,510 and 6,453,830 provide a sampling of this prior work, and are incorporated by reference in their entireties. Specifically, U.S. Pat. No. 4,765,258 discloses that the combustor's stoichiometry, SR1, should be in the range of 50% to 70% (0.5 to 0.7) for peak $NO_x$ reduction. However, as SR1 decreased, the carbon conversion, i.e., the amount of unburned carbon particles entrained in the combustion gases exiting the cyclone combustor, increased.

Figure 1:
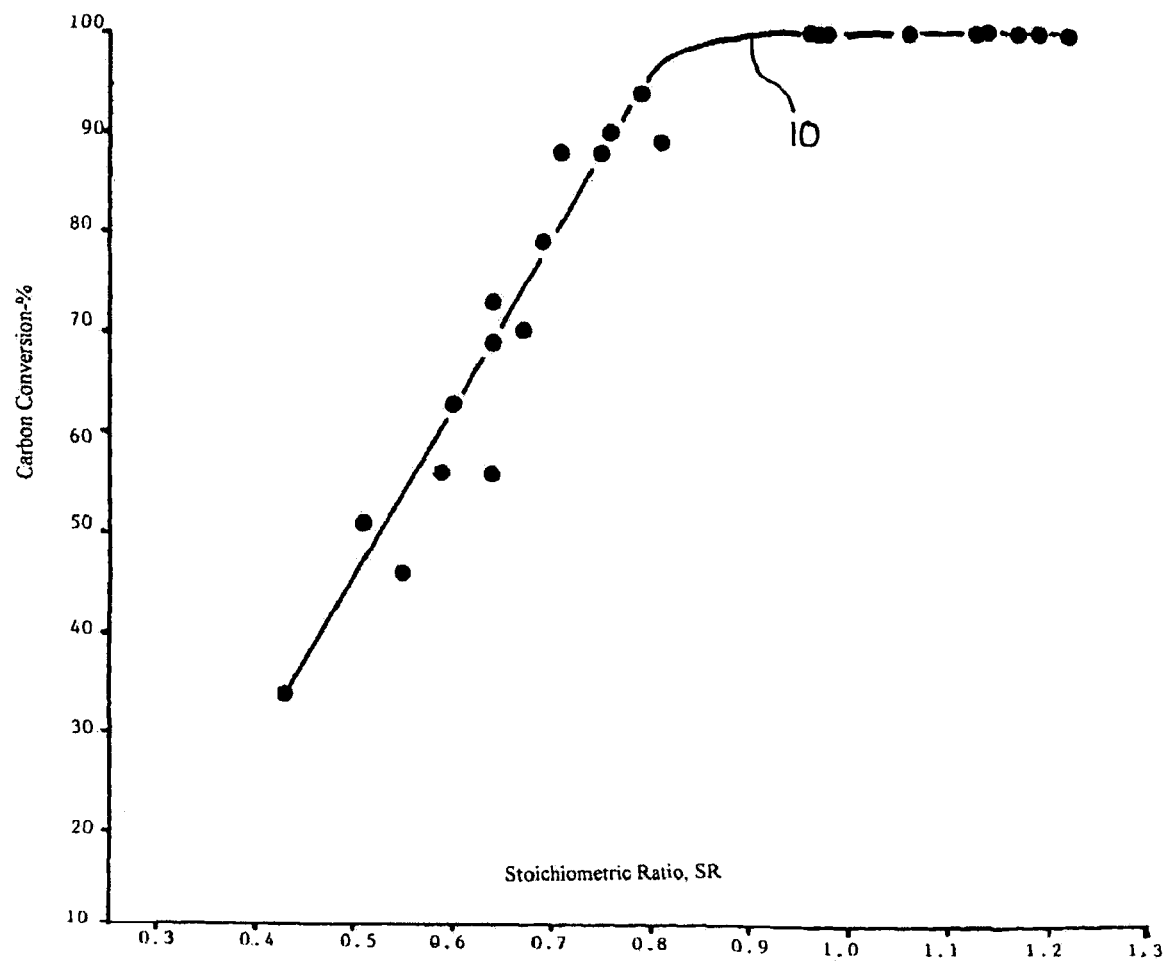
FIG. 1 is a graph illustrating the carbon conversion inside a slagging combustor as a function of the stoichiometric ratio (SR1)

An example of this effect is shown in FIG. 1, which is a plot of data points, indicated generally by reference numeral 10, obtained in the 7 MMBtu/hour cyclone combustor of the carbon conversion inside the primary (first stage) cyclone combustion chamber as a function of its stoichiometry, SR1. The data shows that as SR1 decreased below 0.8, the amount of unburned carbon increased. Similar results were obtained in the 1 MMBtu/hour and 20 MMBtu/hour, air-cooled, cyclone combustors. Examination of FIG. 1 clearly shows that operating the combustor under fuel rich conditions at SR1 of 0.7 to as low as 0.55 results in substantial unburned carbon, which can be removed from the stack gases for immediate placement in a landfill and stored for future use.

To improve carbon conversion at fuel rich conditions in prior work, various techniques were used, including co-firing the coal with oil and natural gas. However, in embodiments of the invention, these auxiliary fuels would typically not be used.

Fuel rich conditions may be achieved in coal fired boilers that are already equipped with "low $NO_x$" burners that reduce $NO_x$ emissions, which is the case for the majority of coal fired electric utility boilers. To date, the primary purpose of these "low $NO_x$" burners has been to reduce $NO_x$ emissions. Since fly ash that has more than 5% unburned carbon content has a low market value, except in special cases, these low $NO_x$ burners are generally operated under conditions that minimize unburned carbon. If instead the degree of fuel richness is increased, the unburned carbon concentration will be increased, thereby reducing $CO_2$ emissions.

As SR1 is further reduced, the amount of unburned carbon increases, thereby allowing more carbon to be stored. The major benefit of this method is that the unburned carbon can be stored either in the usual ash storage site at the plant, or it can be sold for beneficial use, or preferably, in view of the quantities involved, it can be shipped from the collection point in the ESP or BFF to sites that are suitable for sequestration in geologic sites or even in the ocean. The carbon-ash mixture would be stored at this final sequestration site for future use as described below. An additional benefit of this method is that under fuel rich combustion, nitrogen oxide, ($NO_x$), emissions are sharply reduced at no additional cost. $NO_x$ emissions rights can be sold to partially offset the loss in revenue from the unburned carbon. Since fuel rich gases are reducing, the $SO_2$ released during coal combustion can increase metal tube waste in the boiler. Consequently, methods according to the invention are preferably practiced with combustion and post-combustor $SO_2$ reduction methods invented by Zauderer and described in patent application Publication No. 2002/0061271 of May 23, 2002 (corresponding to application Ser. No. 09/964,853), the contents of which are incorporated by reference in their entireties. Of course, other $SO_2$ reduction methods may be used. Additionally, if treaties or regulations come into effect under which emission rights may be sold, the carbon emission reduction methods according to the invention may be saleable.

This method of carbon dioxide sequestration has major advantages over prior art. Specifically:

(1) It can be implemented without any modifications to affected boilers or furnaces.

(2) It avoids the major cost and safety risk of shipping liquid or compressed carbon dioxide gas from an existing coal fired power plant to a point of sequestration. Instead of special tank cars for the $CO_2$ or $CO_2$ pipelines, the unburned carbon-ash mixture can be shipped in the same railroad cars, trucks or barges used to bring the coal to the power plant. During shipping, open top railroad cars would preferably be covered to prevent the powder from blowing away, and if necessary, the powder may be wetted down.

(3) It allows the continued use of the existing inventory of coal-fired power plants until their useful life is exhausted.

(4) The energy content in the unburned carbon can be recovered in the future in power plants erected at suitable $CO_2$ sequestration sites having combustors with the features that are also disclosed in the present invention.

(5) It allows owners of lower $CO_2$ emission, natural gas fired power plants that are idled or partially erected as a result of unfavorable economics to complete the plants in order to supply the reduced electricity production from the existing coal fired power plants that leave the unburned carbon.

(6) It allows the almost immediate implementation of large $CO_2$ emission reductions at reasonable cost.

(7) It sharply increases by at least 50% the reduction of $NO_x$ emissions from U.S. coal fired power plants. This provides revenue to offset the lost electricity sales by the sale of $NO_x$ emission credits.

(8) It also allows the sale of emission rights of $SO_2$ due to the reduced emissions in these coal-fired plants.

(9) It allows the sale of carbon emission rights, if regulations or treaties are adopted that allow such sales.

(10) The method is suitable for overseas power plants as well as domestic power plants.

Because not all of the coal is burned, there may be some reduction in the amount of energy produced. To offset this loss of energy production, other energy sources may be used, including natural gas, biomass, and waste heat. As was noted above, any increased cost may be offset by the sale of emission rights or credits.

In other embodiments of the invention, pyrolysis may be used to separate all volatile matters, which contain the non-carbon as well as the volatile carbon components of the coal. This approach is selected because it is simpler to separate a gas from a solid as opposed to separating gaseous species from oil or natural gas.

For example, in one embodiment, the volatile matter in the coal is removed in a pyrolizer and converted to hydrogen in a second vessel by reaction with pressurized steam and calcium oxide. The balance of the coal containing the fixed carbon and ash is burned in a slagging combustor that is attached to the existing coal fired steam boiler in place of the existing pulverized coal burners. However, if for some reason, such as the existing boiler's design is difficult to retrofit with a slagging combustor, as may be the case with, for example, Combustion Engineering corner fired boilers, or if the geology of the site of an existing coal fired boiler is unsuitable for sequestration in the ground, such as would be the case if no limestone deposits exist deep underneath the potable water strata, or the existing boiler site has inadequate water supply, such as in arid regions, the residual char, consisting of carbon and ash, would be shipped to other existing or new suitable sites for combustion and sequestration. In that sense, this embodiment is similar to the embodiment described above.

However, a preferred method for $CO_2$ removal is on-site sequestration in the earth beneath existing power plants. This should be possible at most sites because limestone deposits are widely dispersed in the Earth as they constitute about 2% of the Earth's crust.

One problem in removing $CO_2$ from combustion gases is the low concentration of the $CO_2$ in the combustion gas stream. This makes removal by getter materials more difficult. Additionally, other gas species, namely water vapor, sulfur dioxide, and nitrogen oxides compete with the carbon dioxide in reacting with getter materials such as metal oxides. Therefore, the advantage in the invention of removing the volatile matter from the coal and burning the residual char is that it increases the concentration of $CO_2$ in the exhaust to about 20% in combustion with air.

In methods and apparatuses according to the invention, it is advantageous to use the air-cooled, slagging cyclone combustor disclosed in U.S. Pat. No. 4,624,191, which was incorporated by reference above, in which the ash is liquefied and drained from the combustor and quenched in water. The high wall temperatures in this combustor ensure excellent combustion of char, which may be difficult to burn in conventional coal burners in the absence of volatile fuel components.

Another benefit of burning char is that the carbon produces a substantially higher (about 160 mm of Hg) partial pressure $CO_2$ concentration in the combustion products at atmospheric pressure than does coal combustion. The advantage is that the equilibrium temperature for decomposition of $CaCO_3$ at 168 mm of Hg is 800° C. (1472° F.). This means that if the $CO_2$ pressure is greater than 168 mm of Hg, the $CO_2$ will react with CaO to form calcium carbonate. This means that CaO that is injected at a gas temperature of about 700° C., where the equilibrium partial pressure of $CO_2$ is 25 mm of Hg, will react with the CaO to form the carbonate. On the other hand, in the products of regular coal combustion, the lower partial pressure of $CO_2$ dictates that the carbonate reaction occurs at a lower gas temperature. Operation of the $CO_2$-CaO capture reaction at a higher CaO particle temperature has several implications:

(1) The reaction of $CO_2$ and CaO occurs primarily within the pore structure of the CaO particles and the larger $CO_2$ molecules rapidly plug these passages limiting reaction in the interior of the CaO. However, by implementing the $CO_2$ reaction at a higher temperature the $CaCO_3$ particles will be heated more rapidly which opens their internal pore structure.

(2) The $CaCO_3$ particles would typically be heated to at least 1700° F. (923° C.) to calcine the CaO so that the partial pressure of the $CO_2$ is above 1 atmosphere and can easily be removed from the calciner. In a typical implementation, the calciner would be cycled between the temperatures of about 1290° F. and about 1700° F. in order to allow continued use of the same limestone. Re-use of the same limestone essentially eliminates the need for extensive mining and shipping of limestone to the power plant.

(3) $SO_2$ and $NO_x$ released during combustion of the char from the sulfur and nitrogen compounds in the char may be removed upstream of the final $CO_2$ removal step. This prevents reaction of these species with CaO particles that are injected to remove CaO. If these species were to react with the CaO they would necessitate more frequent replacement of the limestone in the calciner. Techniques for removing these species are disclosed in the patents cited above.

In one embodiment of this invention, which may be most useful in regions with limited water supplies, CaO particles at about 1292° F. remove the $CO_2$ by injection in the boiler furnace, downstream of the $SO_2$ and $NO_x$ removal steps, to form $CaCO_3$. The $CaCO_3$ is then heated in a separate calcining vessel to about 1700° F. to re-evolve the $CO_2$. The $CO_2$ gas is then compressed to a level sufficient to inject it into a geologic formation, such as a spent coalmine, spent gas well, or saline formation. Alternatively, the $CO_2$ could be injected into the ocean.

However, in other embodiments, $CO_2$ is allowed to mix with underground water to form hydrogen carbonate, $H_2CO_3$, and then mix with underground limestone to form liquid calcium hydrogen carbonate, $Ca(HCO_3)_2$. Groundwater containing dissolved $CO_2$ will dissolve limestone ($CaCO_3$) to form soluble $Ca(HCO_3)_2$. If water containing this substance drips into a cave, in which the pressure is below that needed to retain the $CO_2$ in solution, the $CO_2$ is released and icicle like formations of $CaCO_3$ are formed on ceilings and floor. Therefore, in these embodiments of the invention, carbon sequestration injection would typically be performed in geologic formations that have underground cavities whose pressure is higher than that required to keep the $CO_2$ dissolved in water. This may be done, for example, by ensuring that the injection pipe is deep enough so that its underground outlet is at a sufficiently high pressure to keep the $CO_2$ dissolved in water.

In alternative embodiments of the invention, CaO may not be used to remove the $CO_2$ from the combustion gases. Instead, $CO_2$ may be dissolved by spraying fine water droplets into the exhaust ducts of the boiler that is fired with the char that burns in air or oxygen enriched air. These alternative embodiments eliminate the need for a calciner. However, in order to facilitate dissolution of the exhaust gases in water, the exhaust gases, consisting of $CO_2$ and $N_2$, are compressed to a level where a reasonable amount of water will dissolve the $CO_2$ in the water sprayed into the gas stream. The nitrogen is subsequently separated from this water solution by expansion back to atmospheric pressure to recover its compression energy, and it is then exhausted to the atmosphere. The remaining water solution containing dissolved $CO_2$ is pumped into the ground, as described above.

Nevertheless, in some embodiments of the invention, the limestone-calcining step is retained for the conversion of the volatile mater of the coal to hydrogen. After the volatile matter is heated in a pyrolizer, using embedded metal pipes through which flow the hot $CO_2$ and $N_2$ that exit the calciner, high pressure steam drawn by bleeding the steam turbine in the char fired boiler system pressurizes the volatile matter and then reacts with the volatile gases and the CaO to form hydrogen and $CaCO_3$, which is then returned to the calciner vessel.

Figure 2:
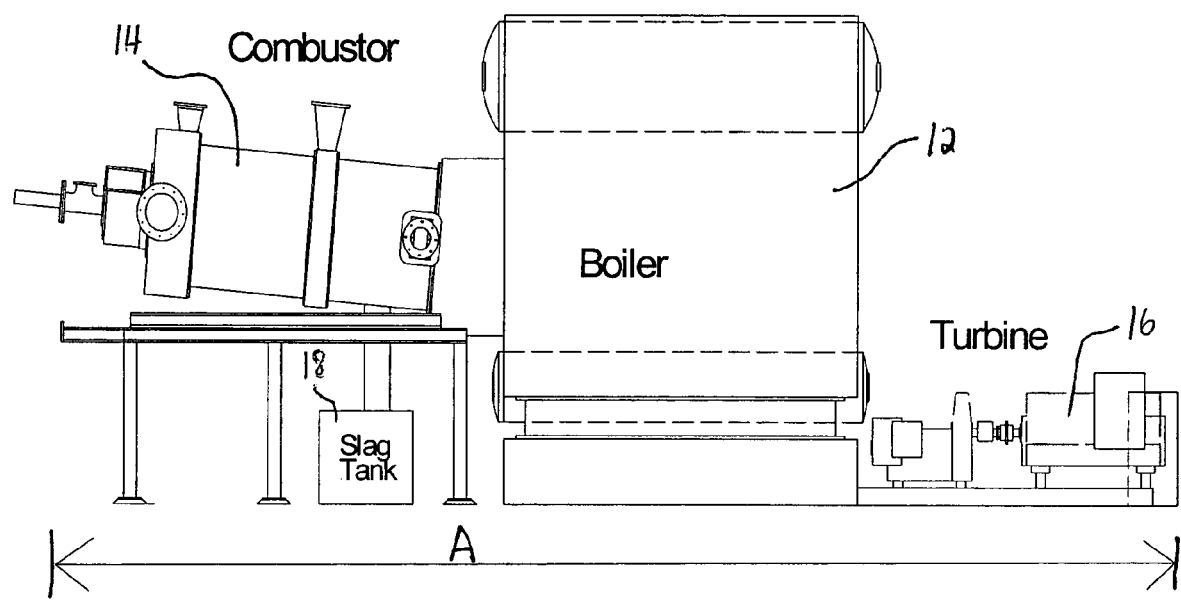
FIG. 2 is an elevational schematic view of the special slagging combustor and typical boiler which may be used in methods according to the invention.

FIG. 2 is a schematic elevational view of a 17,500-pound per hour of steam, D-Frame package boiler 12, of the type manufactured in 1970 by the Keeler Boiler Company of Williamsport, Pa. Its design is representative of this class of oil or gas fired boilers. A 20 million Btu per hour, air-cooled, coal fired cyclone combustor 14 is attached to the boiler 12. The details of its operation and the various streams in and out of the combustor-boiler 12, 14 have been described in great detail in terms of form, function, and use in the prior art, namely, U.S. Pat. Nos. 4,624,191, 4,765,258, 6,048,510 and 6,453,830, which are all incorporated by reference herein. The combustor 12 can be attached to all other boilers ranging from small firetube boilers in the several thousand pound per hour of steam range to large several hundred megawatt electric output utility boilers. Also shown in FIG. 2 are a power generation turbine, indicated at 16, and a slag tank 18. FIG. 2 shows the relative dimensions of the various components 12, 14, 16, and 18. For example, dimension line A, which indicates the overall length of the components 12, 14, 16, 18 would typically be about 35 feet. As those of skill in the art will realize, and as will be described below in more detail, methods according to the invention may use any one of a number of different boilers, combustors, and other components.

Example of Temporary Carbon Sequestration

The following example shows the estimated cost of applying this method to any coal fired system operating under conditions of 80% carbon conversion (C.C.). Here carbon conversion is defined as the percentage of the total amount of carbon in the fuel; namely the sum of the carbon in the volatile matter and the fixed carbon. This is typically in the range of 70% to 80% of the total weight of bituminous coal. Therefore, 80% C.C. leaves 20% of the carbon or 14% to 16% of the total coal weight unburned 20% unburned carbon is selected as an example of the cost of temporary carbon sequestration because it should be achievable with low $NO_x$ burners used in conventional pulverized coal fired utility boilers. According to the Energy Information Administration (EIA) in the year 2001, 806 million tons of bituminous coal were used by electric utilities to generate $1.560 \times 10^{12}$ KWH. Using an average heat rate of 10,360 Btu/KWH (33% efficiency) for U.S. coal fired plants, one computes an average HHV for coal of 10,026 Btu/lb. Also, the total $CO_2$ emissions from burning $0.9 \times 10^9$ (short) tons of coal in 1999 were 471 MMT of carbon, which equals 85% of t he total carbon equivalent emissions of 553 MMT from coal in 1999. This figure was little changed by 2001 when the total carbon equivalent-emissions from coal were 562 MMT. Therefore, the 1999 figures for $CO_2$ emission will be assumed to be the same as in 2001. The $CO_2$ emissions convert to 518 million short tons of carbon, from which one deduces that the total carbon in the coal was 518/806=64.3%. In any case to reduce $CO_2$ emissions by 20% requires removal of 103.6 million short tons of carbon, or 94 MMT. As noted from FIG. 1, the 7 MMBtu/hour cyclone combustor achieved 80% C.C. at an SR1 of 70%. Other coal combustors and low $NO_x$ burners will need to be tested to determine the appropriate SR1, but it will almost certainly be in this general range of SR1 from 0.6 to 0.8 to obtain 80% carbon conversion. Note that final combustion occurs with air that is introduced further downstream of the coal burners that operate fuel rich. The introduction of the final combustion air is standard practice in coal-fired boilers equipped with "low $NO_x$" coal burners, and its practice is widely understood in the industry.

Assuming that the unburned carbon and fly ash will initially be stored in suitable aboveground storage, the electricity production and lost revenue may need to be replaced. The heating value of 103.6 million tons of carbon equals $2.92 \times 10^{15}$ Btu (HHV for carbon equals 14,100 Btu/lb), which represents a loss of $2.82 \times 10^{11}$ KWH, or 18% of U.S. coal fired electricity production.

As noted above, almost all of new power plant construction in the U.S in recent years has been gas fired. These new plants erected as combined gas-steam turbine cycles have much higher efficiencies approaching 50%, or a heat rate of about 7000 Btu/KWH. Assuming 90% capacity factor, replacing the lost electricity requires an installed capacity of 35,768 MW.

According to EIA, 40,220 MW of natural gas fired capacity came on line in 2001, and 50,110 MW in 2002. Also, 6,020 MW of waste heat capacity came on line in 2001 and 12,160 MW in 2002. Also, 23,750 MW of natural gas capacity was delayed in 2002 and 5,490 MW was cancelled outright. Due to the poor economic conditions and overcapacity from new power plants the wholesale price of electricity collapsed to the $25/MWH range. As a result, the excess capacity that came on line is underutilized, driving power plant developers to the brink of, or outright to, bankruptcy. Therefore, any reduced coal fired power can be readily replaced.

Separately, the waste heat power capacity of 18,180 MW in these two years equals to 50% of the proposed lost coal capacity. Presumably this waste heat power will not add to carbon emissions, and it will be at least as efficient as the new gas-steam turbine combined cycle plants. So, in a best-case scenario, only about 50%, or 17,588 MW, will be required from the new natural gas power plants.

As noted, 50% of the replacement for the coal power loss of $2.82 \times 10^{11}$ KWH, namely $1.41 \times 10^{11}$ KWH, will be provided by the new waste heat power capacity that will not add to $CO_2$ emissions. The other 50% of $2.82 \times 10^{11}$ KWH, also $1.41 \times 10^{11}$ KWH, will be from natural gas-fired plants whose nominal heat rate is 7000 Btu/KWH. This requires $9.87 \times 10^{14}$. Btu of natural gas, which at the average price of gas of $3.49/MMBtu in the first 7 months of 2002, would cost $3.44 billion/year. Also, the natural gas will produce 17.6 million tons of carbon. To this is added the (temporarily) lost cost of coal of $2.92 \times 10^9$ MMBtu×$1.216 MMBtu=$3.55 billion. This cost will be recovered when the coal is burned and the $CO_2$ captured and sequestered by practicing the second part of the invention.

However, part of this lost revenue will be recaptured immediately from the sale of $NO_x$ emission rights. In 1999, coal fired electric utilities emitted 6.5 million tons of $NO_x$. Assuming at least a 50% reduction of $NO_x$ by fuel rich combustion, and a value of $500/ton for $NO_x$ emission rights yields revenues of $1.63 billion. (EPA estimated such rights as high as $1400/ton in 2000, and the market price for such rights in the spring of 2003 was $6,500/ton of $NO_x$. For the remainder of 2003, it was around $3000/ton of $NO_x$.).

Therefore, the total current cost of the carbon removal is $5.36 billion, i.e. $3.44 B+$3.55B.–$1.63B. This will reduce carbon emissions by 86 million short tons or 78.3 MMT. This results in a cost of $68.2 per metric ton of carbon or $17 per short ton of $CO_2$, which is far below the $30 to $50 per ton of $CO_2$ estimated by DOE's optimistic scenario. It is about the same as the $15/ton of $CO_2$ in the peridotite or serpentinite mining sequestering process cited in the literature Furthermore, and even more important, it can be implemented almost immediately.

A second scenario (using the 2002 natural gas costs of $3.49/MMBtu) assumes that the 50% waste heat power plants cannot be applied as a credit to the present process and the entire lost energy must be provided by natural gas fired power plants. In that case the total cost would be $3.44 billion more, or a total of $8.8 billion. Also, the net reduction of carbon would be 69 million short tons (i.e. 86 tons-17 tons), or 63 MMT. The cost of $CO_2$ reduction would then be $35 per ton of CO2. This is still not a catastrophic cost.

The above examples were based on $3.49/MMBtu natural gas. The following shows the result that would be obtained based on more recent natural gas and $NO_x$ emission credits: In 2003 natural gas prices increased to about $5.50/MMBtu for utility use, according to EIA. This would have increased the cost of natural gas electricity production by $2 billion/year. Also, the U.S. $NO_x$ emissions from coal power plants decreased to 4.4 million tons/year. One would have expected that this double effect would negate the economics of the present method. Instead, the price of $NO_x$ emission rights increased to an average of $3000/ton because a much lower emission ceiling of 0.15 lb/MMBtu went into effect. Assuming that the addition to the very fuel rich combustion here of Zauderer's post combustion emissions process (Zauderer, U.S. Pat. Nos. 6,048,510 and 6,453,830, both of which are incorporated by reference in their entirety) reduces the total $NO_x$ by a very conservative 50%, or 2.2 million tons in existing coal fired power plants, the revenue from $NO_x$ emission rights at $3000/ton would equal $6.6 billion. Therefore, the net cost of removing 78.3 MMT would be $5.5 B.(natural gas)+$3.55 B. B (coal)–$6.6 B.($NO_x$ credit) =$2.45 Billion, or $31.3 per metric ton of carbon, or $8.53 per metric ton of $CO_2$. So despite a 60% increase in the price of gas, the much higher increase in $NO_x$ emission rights cut the price of carbon emissions in half. While the price of coal has also increased in 2003, much of that increase is due to greater use of low sulfur coal. However, Zauderer's $SO_2$ control processes allow the economical use of high sulfur, low cost coal.

The above carbon reduction costs may be further reduced because Norway and Sweden have recently enacted a carbon tax of $50/ton of $CO_2$. European and Asian countries that have enacted the Kyoto protocol are allowing carbon emission trading. Assuming the reduced carbon rights can be sold for only $25/ton of $CO_2$ to these countries, the carbon reduction cost would be reduced by $2.15 billion for the first scenario (of replacing the lost carbon with 50% natural gas and 50% waste heat power) resulting in a net cost of $3.21 billion, which equals to $10.2/ton of $CO_2$, and $1.73 billion in the second scenario (of replacing all the lost carbon with natural gas power) resulting in a cost of $7.07 billion, which equals $28/ton of $CO_2$. Finally, in the third scenario, the one that uses the 2003 natural gas price of $5.50/MMBtu and $NO_x$ trading prices of $3000/ton of $NO_x$, the net cost of carbon reduction would be $0.3 billion, or $1.2/ton of $CO_2$.

Use of Biomass as a Replacement Fuel

In the examples and example scenarios given above, it was assumed that power from natural gas fired turbines could be used to replace any power lost because of carbon sequestration. In other embodiments, biomass may used to generate replacement power instead of natural gas fired turbines. For example, in a $4^{th}$ scenario 50% of the lost carbon energy would be supplied by waste heat power plants, and the other 50% of the lost coal carbon power would be replaced with biomass power. As noted above, 50% of the (temporarily) lost carbon power of $1.41 \times 10^{11}$ KWH, is replaced in an equal amount by the agricultural residue of the U.S. corn and wheat crops and waste heat generators. The approximate residue from the 1990 corn and wheat crops was 300 million short tons (dry basis), which represents a heating value of $4.6 \times 10^{15}$ Btu. The biomass is pyrolyzed or partially gasified, and the residual carbon char and ash are fired in the slagging combustor 12 shown in FIG. 2. A combined gas turbine-steam turbine cycle can reach a heat rate that is estimated at 9000 Btu/KWh, as described below. The gas turbine part of this cycle will be described below with respect to FIG. 4. Therefore, the potential power output from the corn/wheat crop residue is $5.11 \times 10^{11}$ KWH.

50% of the lost coal carbon power is $1.41 \times 10^{11}$ KWH. This equals 28% of the U.S. corn and wheat crop total residue of the $5.11 \times 10^{11}$ KWH that is needed to makeup the lost carbon power. One difficulty with crop residue is that its very low density (<10 lb/cu.ft) makes shipment to power plants over about 75 miles from the farm expensive. Therefore, small, distributed power plants, using the same gas turbine and steam turbine components 16 as shown in FIG. 2 may be used in embodiments of the invention. They can be portable to about 5 MW and possibly 10 MW by using only the pyrolizer/gasifier and gas turbine part of the cycle, which can then be moved from one farm region to another, as different crops are harvested. The residual char, which represents about one-half the energy and has a higher bulk density, can then be shipped at about one-quarter of the cost of the raw crop residue to larger plants, nominally rated at 20 MW and more centrally located in farm regions.

Figure 3:
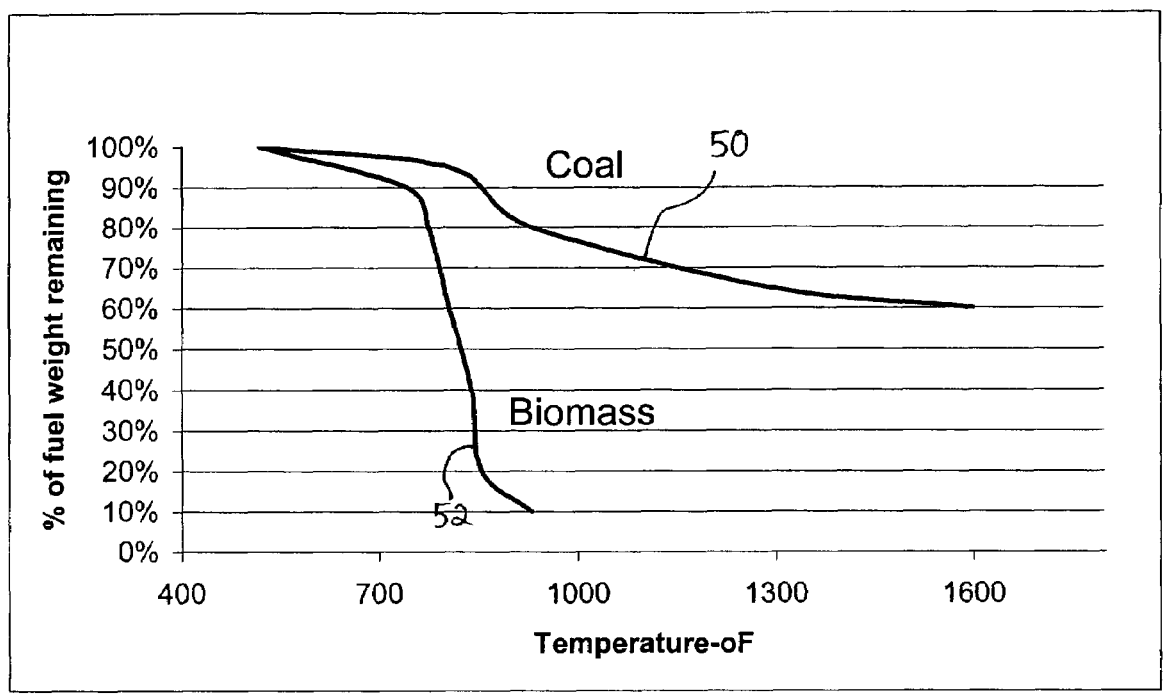
FIG. 3 is a graph illustrating typical pyrolysis rates for coal and for biomass as a function of process temperature.

Note that the fixed carbon in biomass represents only between 12% and 20% of the total weight of biomass, while FIG. 3, a graph compares the pyrolysis rates as a function of temperature of coal 50 and the cellulose in biomass 52 which is typically 50% of the total biomass weight. Furthermore, the fixed carbon cited by some literature in the field is only from 22% to 33% of the heating value of the eight types of biomass fuels. In fact, the higher heating value of the biomass derived from the ultimate analysis of the hydrogen and carbon cited by literature is about 30% greater than the stated higher heating value. This leads to the conclusion a substantial part of the carbon and hydrogen in the volatile matter is combined as carbon dioxide and water and, as such, is unavailable as fuel.

This suggests that it may be preferable to operate the pyrolyzing reaction at a higher pyrolyzing temperature than the 450° C. (842° F.) shown in FIG. 3. In fact, other graphs in the literature show that at about 875° C. (1607° F.), about 40% of the entire biomass remaining after devolatilization at 450° C. is gasified within 1 minute.

Due to the seasonal nature of agricultural biomass production and due to the isolated nature of farm fields throughout the world (they are most probably far removed from electric power transmission lines), it may be preferable to convert all the volatile matter in the biomass to hydrogen. The hydrogen conversion method is described below in connection with the hydrogen production and carbon dioxide sequestration of coal, as per FIG. 4. This would allow the use of the hydrogen as a transportation fuel. Since biomass is a renewable fuel, there would be no need for the carbon dioxide sequestration step that is needed for coal. This would greatly simplify and reduce the cost of the entire process, and greatly increase its economic value, especially to the farmers to the point where their income from crops such as corn could double from current (2003) grain prices by sale of the hydrogen and carbon emission credits. The hydrogen would be compressed to high pressure levels, e.g. 5000 psi, using the steam within the hydrogen production process and further compression of gaseous hydrogen for sale as a transportation fuel. The residual char as well as a small fraction of the hydrogen or of the carbon released in the volatiles would be fired in the combustor of a boiler to calcine the calcium carbonate and to generate the steam that is used in the hydrogen production process in a high pressure boiler, as wilt be described below with respect to FIG. 4.

In some embodiments, the pyrolysis/gasification part of the cycle may be separated from the residual char-vapor turbine, bottoming cycle. This allows the economical shipment and storage of the denser biomass char to a larger plant in a similar manner as it is for the hydrogen production-biomass option. On this basis, a conservative 50% capacity factor is assumed in the present analysis for this biomass char. The 50% or $1.41 \times 10^{11}$ KWH annual output that is assigned to biomass under this assumption requires a generating capacity of 32,200 MW, or 1600 plants rated at 20 MW.

A study of the cost of paying Nebraska corn farmers $10/ton for the lost fertilizer in the corn residue, plus the cost for collecting, bailing, and shipping corn residue up to 75 miles, yielded in that study an estimate of $41 to $50 per ton of biomass that had 20% moisture. However, since the gas turbine cycle may be separated from the vapor (steam) turbine cycle, in which case only the latter's char fuel will be shipped (dry), a more appropriate cost for biomass fuel in embodiments of the present invention might be $30/(dry) ton. At 15.2 MMBtu/dry ton this yields a fuel cost of about $2/MMBtu, and a total annual cost of $2.54 billon. Adding the lost coal power of $3.55 billion and subtracting the $1.63 billion $NO_x$ credit (used in the first scenario above), yields a total cost for this fourth scenario of $4.46 billion. The capital cost of these plants has not been included because it is probable that should this fourth scenario be adopted, tax credits may be given for the use of renewable energy sources. Even without credits, the long life of these compact power plants, likely at least 20 years, makes the capital cost component small compared to the fuel cost. In any case, this fourth "biomass" scenario reduces the cost of the entire 103.6 million short tons or 94 MMT of carbon emissions, yielding a cost of $11.7/short ton of $CO_2$. If one further subtracts a $25/MMT for carbon credits for the 94 MMT reduction, which equals to $2.35 billion, the result is a net cost of $2.11 billion, or $5.55 per short ton of $CO_2$.

The following shows the impact on electricity prices in practicing this invention: In 2001 the annual average revenue of electric utilities was 7.18 cents per kWh. Applying the cost of the $1^{st}$ scenario (50% natural gas-50% waste heat power replacement for the lost carbon power), the 2 scenario (100% natural gas power) and the $3^{rd}$ scenario (50% biomass-50% waste heat power) to the total U.S. electricity production by bituminous coal in 2001 of $1.56 \times 10^{12}$ kWh, results for scenario 1 in an added cost to consumers of 0.34 cents/kWh w/o the $CO_2$ credit and 0.21 c/kWh w. the $CO_2$ credit. The respective numbers for scenario 2 are 0.56 c/KWH, and 0.45 c/kWh, and for scenario 3 they are 0.275 c/kWh and 0.013 c/kWh, respectively. Since coal is only 50% of total U.S. electricity production, the added cost to consumers must be reduced by 50%, resulting in cost increases to consumers ranging from 0.95% to 3.9% to the price of electricity.

In summary, the $CO_2$ reduction would be 78.3 MMT when the reduction is provided by 50% waste heat and 50% by natural gas power plants. The reduction would be 63 MMT when 100% of the coal carbon reduction is offset by natural gas power plants, and 94 MMT when 50% is replaced with waste heat and 50% with agricultural residue power plants.

In 1999, carbon dioxide emissions from electric power in the U.S.A. were 471 MMT of carbon, or 31% of the total emissions of 1517 MMT for that year. Also, the coal power plants represented 85% of the 553 MMT emitted by all coal combustion sources. Now to meet the Kyoto protocol of 7% emission reduction from 1990 levels would have required in 1999 a reduction of 260 MMT. Of this amount the 31% contribution of coal fired electric plants to Kyoto would have been 80.6 MMT, and the total contribution of all coal combustion to Kyoto would have been 36% of 260 MMT, or 94 MMT. These numbers did not change by 2001 in that the total emission increased by 1.5% and coal by 1.6%. Therefore, scenario 1, which can be implemented almost immediately, would have met the Kyoto objective for coal-fired power plants within 2.3 MMT (i.e. 80.6–78.3). Scenario 4, which requires the use of agricultural crop residue could have met the entire 94 MMBT contribution for coal, also almost immediately, if the residue were shipped to conventional power plants at higher cost.

Example of Permanent Carbon Sequestration

The following discussion on carbon sequestration utilizes as an example an existing coal fired power plant that is originally rated at 100 MWe output. It is modified to practice this invention of hydrogen production and carbon sequestration. When the hydrogen is utilized to drive a combined gas turbine/steam turbine power plant, the power output of the modified plant is doubled. All the numbers cited in the example apply to this modified power plant.

A step involves compression from atmospheric pressure of the two gases exhausting from the plant, namely a mixture, $CO_2$ and $N_2$. The selection of the compression needed depends on a number of interacting parameters. Two compression ratios are selected to demonstrate this interaction.

The first one is to compress the $CO_2$ and $N_2$ from atmospheric to a nominal pressure of 147 psig (10 atmospheres). This pressure reduces the amount of water needed to dissolve the $CO_2$ in water, as will be shown below, which is useful in separating $N_2$ from $CO_2$. To minimize the compression power, three-stage compression is implemented with a pressure ratio of 2.154 per stage, and intercooling to ambient between stages. For the conditions of the 100 MW power plant, this step consumes about 33 MWe.

Water at somewhat higher pressure is then injected into this pressurized gas stream to drive the $CO_2$ into solution in the water. The mass flow rate of water is selected on the basis that the gas obeys Henry's Law for gas solubility in water as a function of pressure. Based on solubility data, $CO_2$ in water at a nominal ambient temperature of 24° C. (75° F.) and 1 atmosphere pressure dissolves 0.1493 gm of $CO_2$ per 100 gm of water. This solubility means that 670 times more water than $CO_2$ would be required to drive the $CO_2$ into solution, which requires far too much water. Cooling the gas and water to near zero centigrade, e.g. 2° C., would double the solubility and cut the water required in half. However, the refrigeration power may be unacceptably high. For those reasons, Henry's Law is invoked and the gases and water are compressed in this example to 10 atmospheres. A small fraction of the $CO_2$ dissolved in the water forms carbonic acid, $H_2CO_3$ as per equation 1:

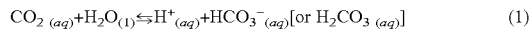

$$CO_{2\,(aq)} + H_2O_{(l)} \leftrightarrows H^+_{(aq)} + HCO_3^-{}_{(aq)} [\text{or } H_2CO_{3\,(aq)}] \quad (1)$$

Therefore, by Henry's Law at 10 atm. and 75° F., 67 times more water than $CO_2$ (100 gm $H_2O$/1.493 gm $CO_2$) is needed, which may be too high, as will be shown. Since $N_2$ is about 60 times less soluble in water at this temperature and pressure, essentially all the $N_2$ will remain in the gaseous state. It is therefore, possible to separate the liquid from the gas by various commercial processes, e.g., centrifugal separation.

Applying this to the 100 MWe steam power plant, one finds that the total $CO_2$ exhausted from this plant is 444,000 lb/hr, which requires about 10 MWe to compress the $CO_2$ in 3 stages at 80% compressor efficiency to 10 atm. This $CO_2$ emerges from the calciner and boiler duct exhausts mixed with the $N_2$ at 814,000 lb/hr. This requires 23 MWe to compress the $N_2$ in 3 stages to 10 atm with intercooling.

The water flow rate of 67 times the $CO_2$ mass flow rate needed to dissolve the $CO_2$ requires 5.4 MW of pump power, assuming a 70% mechanical pump efficiency. This capacity can be achieved with a turbine pump.

To summarize the steps to this point, the compression of the $CO_2$ and $N_2$ is selected to minimize the compression power of these two gases. After the nitrogen is separated from the $CO_2$ that is dissolved in water, it flows through a pressure smoothing accumulator vessel before expanding through an expansion turbine. This allows recovery of most of this compression power from the $N_2$ by its expansion the turbine. This is a simple task because the gas temperature has been cooled to ambient after compression to prevent $CO_2$ evolution as a gas. It may be helpful to slightly reheat the $N_2$ with low temperature waste heat from the power plant in order to prevent negative cooling from the Joule-Thompson effect. Assuming a 90% energy recovery of the compressed $N_2$ will yield about 21 MWe of electric power. In other words, the net power consumed to compress and then recover the compression work is only 2 MW (−23 MW compression+21 expansion).

This is a benefit in the invention because if for example, only 100% $O_2$ had been used for combustion purposes, which would eliminate the need for $N_2$ separation and is a step favored by much of the prior art, a large amount of power would be required to separate the oxygen (assumed here optimistically at about 0.25 MWe per ton of atmospheric $O_{2-}$. This power expenditure is essentially unrecoverable. Thus, in the example, 444,000 lb/hr of $CO_2$ would require 322,900 lb/hr or 161 tons of $O_2$ per hour, which results in 40 MWe of unrecoverable $O_2$ production power. This is 20 times the 2 MWe net lost in the present $N_2$ approach. Furthermore, this approach avoids the cost of the $O_2$ plant and the safety risk of firing coal with pure oxygen or even oxygen enriched air, or the extra power required to dilute the oxygen with inert gas, such as steam or $CO_2$, to eliminate this hazard.

After the nitrogen has been removed, the water-hydrogen carbonate, $(H_2CO_3)$, solution is compressed in order to sequester the $CO_2$ in the ground. The water-hydrogen carbonate, $(H_2CO_3)$, solution may be sequestered in the ground well below any potable water aquifers. The depth will depend on the local geology beneath the existing plant.

For purposes of explaining the practice of this invention, a depth 2150 feet (656 meters) is selected. This depth is arrived at by noting that the pressure increases by an average of 0.465 psi per foot penetration into the Earth. Therefore, the water-hydrogen carbonate solution is compressed to 1000 psi. Of course, the actual depth depends on the geology under the power plant and may vary. However, it is to be noted that this depth is in the range of a current oil well in the North Sea that pumps $CO_2$ to a depth of 3280 feet (1000 meters) below the surface of the Sea, where the pressure is 1457 psi.

Therefore, a step in the $CO_2$ sequestration is to increase the pressure of the hydrogen carbonate-water solution in order to pump it into the ground, as is described below. To implement this step with the 147 psi solution used in this first example, the water solution pressure is increased to a nominal 1000 psi to allow pumping it to 2150 feet into the Earth. This consumes 37 MWe, assuming 70% mechanical pump efficiency. Now adding the 10 MWe compressor power consumed to achieve 147 psi with the $CO_2$ and the 2.3 MWe net (i.e. 23.2 MWe compression and 20.9 MWe expansion), for $N_2$, and the 5.4 MWe pump power for achieving 147 psig in the water, results in a total power consumption of 54.7 MWe rounded to 55 MWe. This equals 25% of the combined gross power of 221 MWe of the modified 100 MWe coal fired power plant used as an example below on how to practice this invention.

As those of skill in the art should realize, 25% power consumption to pump a hydrogen carbonate solution into the ground may be excessive. In addition, the volume of water needed to practice this embodiment, approximately 30 million pounds per hour, may also be excessive. The dissolved $CO_2$ and $H_2CO_3$ could be separated from the water, but this may not be possible to accomplish economically. Therefore, in some embodiments, the concentrations of dissolved $CO_2$ and $H_2CO_3$ may be increased. Increased concentration of dissolved $CO_2$ and $H_2CO_3$ may be achieved by lowering the temperature of the water. For example, in the initial assumption above a water temperature of 24° C. was used at which the solubility is 0.1493 gm of $CO_2$ per 100 gm of water.

However, in at least the northern half of the U.S., ground water, whether from rivers or aquifers, is about 40° F. in the winter and about 60° F. on average in summer. Therefore, assuming an average water temperature of 50° F. (10° C.) increases the $CO_2$ solubility to 0.2318 gm per 100 gm of water.

Additionally, in some embodiments, the intermediate pressure step of 147 psi may be eliminated and the $CO_2$ and $N_2$ may be compressed to 1000 psi and the water to 1000 psi. This results in a need of only 6.4 lb of water per lb of $CO_2$. Applied to the modified 100 MW power plants, this yields a need for 2.8 million lb/hour of water, which is only 9.4% of the water flow in the 147 psi example. This, of course, sharply reduces the pumping power to 1000 feet in the ground to 5.2 MWe (from the total 42.4 MWe in the 147 psi example). However, it also increases the gas compression power, which is now 19.7 MWe for the $CO_2$ (compared to 10 MW in the previous example. Also, the net compression and expansion power for $N_2$ is 6 MWe, i.e. the difference between 59.7 MWe for $N_2$ compression and 53.7 MWe for $N_2$ expansion. Thus while $N_2$ compression power for 1000 psi is about double that in the 147 psi example, the recovery of 90% of this compression power in a very low temperature expansion turbine reduces the total internal power consumption for the 1000 psi example to 31 MWe, which is only 14% of the new total power output of the plant of 221 MWe.

One result of operating in this fashion is that a significant part of the modified power plant's output is derived from the $N_2$ expansion turbine. Note that more or fewer compression stages can be used, except that little added efficiency would typically be gained by adding compression stages. Also, a turbine is selected instead of reciprocating compressors and expansion engines because at the 100 MWe nominal plant size selected, the compression power is almost 80 MW.

The final step in the $CO_2$ sequestration is pumping it into the ground, to a depth of 2150 feet in the present example. This may be accomplished, for example, by placing a pipe into the ground as is done in oil well or gas well practice. The number of such down pipes necessary will depend on the geology under the existing power plant.

Example of Hydrogen Production by Coal Pyrolysis and Capture and Sequestration of Carbon Dioxide in an Existing 100 MW Electric Power Plant. The hydrogen production method in this invention utilizes novel processes that differ substantially from prior art of hydrogen production. In the present invention pyrolysis is limited to the volatile matter in the coal that contains all the hydrogen and volatile hydrocarbons at temperatures where said materials are released, while retaining the balance of the coal, the fixed solid carbon and ash, in the solid state. FIG. 3 shows that pyrolysis of volatile matter in biomass, whose volatile matter equals about 50% of the total biomass weight, is complete at about 840° F. (450° C.). On the other hand, the volatile matter in a typical coal is generally under 40% of the total weight and full vaporization of the volatile hydrocarbons and hydrogen requires a temperature of about 1500° F. Much of this volatile matter released will be hydrogen, hydrogen-carbon compounds, and other compounds in much lower concentrations such as the non-pyrite sulfur. However, some of the carbon bearing volatiles will be in the form of high viscosity liquids, such as tars, which will either remain attached to the solid carbon or released as liquid droplets. This can be captured in a filter, as described below. The pyrolysis temperature can be increased so as to release these tars in the vapor state or even release some of the solid carbon into the gas phase. The balance of the coal, consisting of solid carbon and mineral ash will be removed from the pyrolysis vessel and conveyed to the air-cooled slagging combustor that is attached to the original coal fired steam boiler.

The objective of the present pyrolysis method is to maximize the release of hydrogen from the volatiles into the gas phase, while maximizing the retention of carbon in the solid state. This is opposite to the prior art practiced for over a century of R&D and commercial gasification processes. The objective of prior gasification efforts was to achieve high efficiency in obtaining coal derived gas for heating, lighting, and power production in gas turbine power plants. In contrast, the present objective is to remove $CO_2$ from the combustion gases released to the atmosphere, and to maximize the hydrogen gas formation. The simplest way to accomplish this is to remove volatile matter from the coal and then burn the solid carbon and ash, namely the char, separately. This concentrates the $CO_2$, which reduces the energy expenditure needed to remove and sequester the $CO_2$. An advantage of this approach is that it allows the seamless transition from existing coal fired power plants to new power plants that are fully integrated for $CO_2$ sequestration.

Another advantage of the presently disclosed approach over the traditional water gas reaction for producing hydrogen, in which steam is passed over hot carbon to produce carbon monoxide and hydrogen, is that that the latter process occurs at higher temperature because both the volatile and solid carbon is gasified. Also, a second shift reaction is necessary to convert the carbon monoxide to $CO_2$, which requires a catalyst, and must then be followed by $CO_2$ separation from the $H_2$. Thus while the presently disclosed $CO_2$ separation process from $N_2$ followed by terrestrial sequestration of a $CO_2$—$H_2O$ solution can also be applied to the direct $CO_2$—$H_2$ production method, the present method is more thermally efficient as it operates at lower temperatures, and proceeds in one chemical reaction, and does not appear to require catalysts.

The pyrolysis step can be divided into two sub-steps. One is the release of the hydrogen in the volatile matter into a gas phase. The other is to convert the carbon element and compounds released from the volatile matter and convert it into hydrogen. The chemical reaction that is needed to implement this second step is an adaptation of a carbon dioxide removal step that was disclosed by others in prior art, although persons knowledgeable in elementary chemistry could readily derive it by an energy balance of the heats of formation of the affected species.

Specifically, the carbon released during pyrolysis will react with CaO that is calcined in a separate vessel from calcium carbonate and both will combine with steam that is bled from the steam turbine in the original coal fired power cycle at a pressure of about 10 atmospheres. The use of steam bleed from the turbine is selected because it involves substantially less compression power than performing the reaction at atmospheric pressure and then compressing the hydrogen. Also, the reaction shown in equation (2) proceeds faster at higher pressure.

$$CaO + C + 2H_2O >> CaCO_3 + 2H_2 + 0.7 \text{ kJ/mol} \qquad (2)$$

This reaction is essentially energy neutral at ambient conditions, but has sufficient driving force at 500° C. to 800° C. to transfer carbonization and carbon reactions and leave sufficient energy in the hydrogen for subsequent combustion. In the present invention this reaction is implemented at less than 700° C. (1291° F.) in order to prevent the release of $CO_2$ from the $CaCO_3$ that is formed by reaction (1). It is emphasized that the purpose of using reaction (2) is to produce hydrogen from the carbon in the coal, and not to remove the $CO_2$ from the combustion of coal. As noted above, the advantage of the present approach as opposed to the traditional water gas and shift reactions for hydrogen production is that in the latter one is left with a mixture of $CO_2$ and $H_2$ gas, from which the $CO_2$ must be removed. In the present invention, the $CO_2$ is removed by the formation of $CaCO_3$, a solid. Another advantage is that the present process can proceed at lower temperatures and is therefore more efficient In practicing the present invention the $CaCO_3$ is recycled to a calciner vessel where the $CO_2$ is released and mixes with the $CO_2$ and $N_2$ from the combustion gases that calcine the $CaCO_3$. The two hot gases, at a temperature of about 1700° F. are then used to preheat the combustion air for the calciner vessel as well as to indirectly heat the pyrolysis vessel. The $CO_2$ and $N_2$ are thus cooled to ambient conditions, and then undergo separation followed by release of the $N_2$ and sequestration of the $CO_2$ that is dissolved in water and pumped underground, as described in the next sub-section. Thus in the present invention, the CaO is not used to permanently sequester the $CO_2$, but only to produce hydrogen.

Calcination of $CaCO_3$ is a key step in the present hydrogen production process. It is essential to perform this calcination between about 1290° F. and 1700° F. At this upper temperature, the pressure of carbon dioxide is slightly above one atmosphere, and there is little economic benefit in higher temperatures. Below the lower temperature, the CaO will react with water vapor to form $Ca(OH)_2$, which will not react with and remove $CO_2$.

An important element of the present $CO_2$ separation process is that separation of carbon from coal is simpler to implement than separation of $CO_2$ from natural gas or oil. In the latter two fuels, the carbon and hydrogen in the fuel are both in the same liquid or gaseous state. Therefore, a chemical process must be used to separate them from the fuel.

Figure 4:
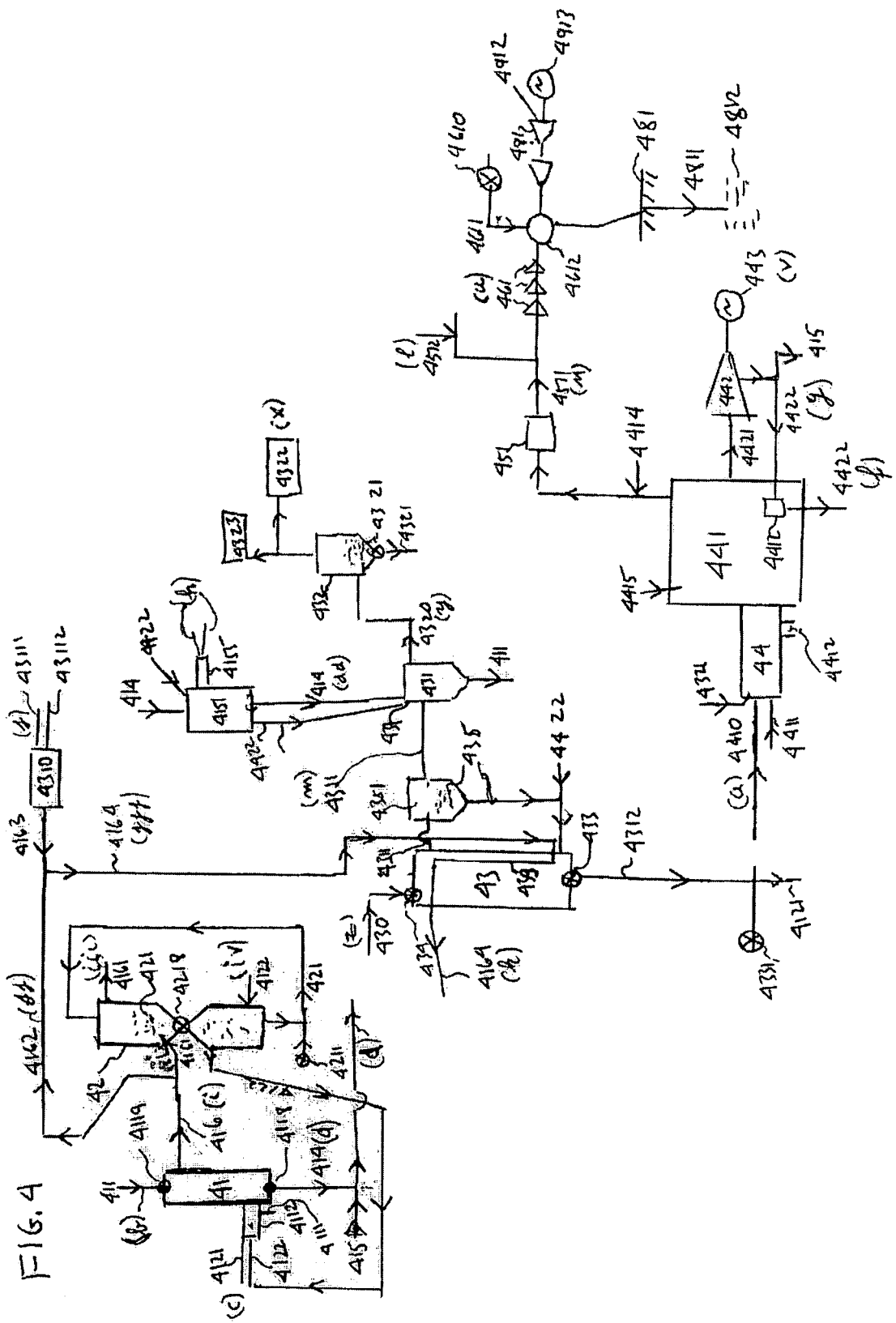
FIG. 4 is a diagram schematically illustrating an apparatus and process for practicing methods according to the invention.

To clarify how to practice this invention of $CO_2$ removal and $H_2$ production, its application to an existing 100 MW electric output power plant is given, and shown schematically in FIGS. 2 and 4. The various flow and energy streams are quantified with reference to a typical Pennsylvania bituminous coal, it being understood that any U.S. or foreign coal can be utilized. Furthermore, the only feedstocks needed to practice this invention are coal, water, and limestone. It is also understood that the numbers and arrangement of components are only meant to convey how this invention can be practiced. Therefore, small energy elements, such the energy used to melt the coal ash in the slagging combustor or the reagents used to remove pollutants are ignored. Persons knowledgeable in the field can readily perform accurate analyses of this system and design the needed components to implement a commercial system. Also, the geological details and underground drilling and pipe installation as applicable to the disclosed method of carbon dioxide sequestration are sufficient to allow persons of skill in the art to implement them. Moreover, the details of a combined cycle, gas turbine-steam turbine power plant are well understood and only its overall power output and efficiency as indicative of the current state-of-the-art are cited herein. Therefore, the description of the invention focuses on the novel concepts in the type, arrangement and integration of the various sub-systems in an existing coal-fired power plant; however, it should be understood that this invention can also be readily practiced in a new power plant situated on a site with the most favorable geologic features for carbon dioxide sequestration.

As was described above, one feature of certain embodiments of the invention is the use of char, consisting of devolatilized coal, as the fuel for the balance of the power plant that is not fired with hydrogen. Therefore, embodiments of the invention may be efficiently practiced by the use of a slagging, air-cooled, cyclone coal combustor as disclosed in U.S. Pat. No. 4,624,191, which was incorporated by reference above. Furthermore, in the following description, it is assumed that pollutants released during coal combustion, such as $SO_2$, $NO_x$, dioxins, furans, and volatile trace metals, including mercury, are removed prior to the exhaust of the $CO_2$ and $N_2$ to the gas separation and the $CO_2$ to the sequestration sub-system. U.S. Pat. Nos. 4,765,258, 6,048,510 and 6,453,830, and U.S. Provisional Patent Application Ser. Nos. 60/430,090, 09/964,853, and 60/433,609 disclose emission controls, and all of these patents and applications are incorporated by reference herein in their entirety.

To quantify the present example and show how to implement this invention, a PA bituminous coal is selected. Its proximate properties are: 30% volatile matter, 58.3% fixed carbon, and 2.6% water. Its ultimate properties are: $H_2O$-2.6%, C-76.5%, $H_2$-4.9%, S-1.3%, $O_2$-3.9%, $N_2$-1.6%, Ash-9.1%, HHV-13,160 Btu/lb, as received. All the analysis shown is based on this coal, but the analysis applies to any other coal.

As shown in FIG. 4, the original existing coal fired boiler 441 is rated at 100 MW electric output, when fired on coal. However, in this example, the boiler 441 is fired with the char remaining after pyrolysis of the volatile matter in coal as well as after subtracting the char required to fire the calciner. (The bracketed letters, such as (a), refer to the state points at that location in the system, and they are listed in Table 1.) Also for simplicity, the heat required to melt the ash in the slagging combustor as well as the fuel value of sulfur, the energy needed to calcine the limestone used to condition the slag and capture the sulfur in the combustor, as well as the energy needed to vaporize water droplets to capture other pollutants, are all ignored in the present example because they represent second order losses and only add to the complexity of describing this invention.

TABLE 1

| STATE POINTS | | | | | | | | | | |
|---|---|---|---|---|---|---|---|---|---|---|
| (a) | Char, lb/hr | 76,434 | O2, lb/hr | 203,824 | N2, lb/hr | 670580 | | | | |
| (b) | CaCO3, lb/hr | 240,112 | Temp, ° F. | 1,292 | | | | | | |
| (c) | char, lb/hr | 15,360 | Temp, ° F. | 1,500 | air, lb/hr | 174455 | air temp, ° F. | 1700 | | |
| (d) | CaO, lb/hr | 134,478 | Temp, ° F. | 1,700 | Steam, lb/hr | 6724 | Steam, psi | 150 | Steam, ° F. | 570 |
| (dd) | CaO, lb/hr | 134,478 | Qin, MMBtu/h | 13 | Steam, lb/hr | 87549 | CO2, lb/hr | 1356 | Steam, ° F. | 1500 |
| (g) | steam, lb/hr | 86,440 | Steam, ° F. | 570 | Steam, psi | 150 | | | | |
| (f) | steam, lb/hr | 86,440 | Steam, ° F. | 1,000 | Steam, psi | 150 | | | | |

TABLE 1-continued

STATE POINTS

| | | | | | | | | |
|---|---|---|---|---|---|---|---|---|
| (h) | CH4, lb/hr | 493 | O2, lb/hr | 1,970 | Qin, MMBtu/h | 10.6 | | |
| (i) | CO2, lb/h | 161,954 | N2, lb/hr | 134,761 | Temp, ° F. | 1725 | | |
| (ii) | CO2/N2, lb/h | 173,992 | Temp, ° F. | 1,725 | | | | |
| (iii) | CO2/N2, lb/h | 173,992 | Temp, ° F. | 130 | | | | |
| (iv) | air, lb/hr | 174,455 | Temp, ° F. | 75 | | | | |
| (j) | CH4, lb/hr | 659 | Air, lb/hr | 11,291 | Qin, MMBtu/h | 14.2 | | |
| (jj) | CO2/N2, lb/h | 122,723 | Temp, ° F. | 1,725 | | | | |
| (jjj) | CO2/N2, lb/h | 134,673 | Temp, ° F. | 1,932 | | | | |
| (k) | CO2/N2, lb/h | 132,992 | Temp, ° F. | 130 | Water, lb/h | 1681 | Total, lb/hr | 134,673 |
| (l) | CO2, lbhr | 143,423 | N2, lb/hr | 143,423 | Temp, ° F. | 130 | | |
| (m) | H2, lb/hr | 7,715 | Carbon, lb/h | 28,281 | Pressure, lb/h | 150 | Temp, ° F. | 1500 |
| (n) | CO2, lbhr | 280,258 | N2, lb/hr | 670,580 | | | | |
| (z) | coal, lb/hr | 157,450 | | | | | | |
| (w) | char, lb/hr | 91,794 | Temp, ° F. | 1,500 | To 44, lb/hr | 76434 | To 4112, lb/hr | 15360 |
| (y) | H2, lb/hr | 17,308 | Temp, ° F. | <1290 | Press, psi | 150 | | |
| (x) | H2 Combined Cycle Power, MWe | | | 124 | | | | |
| (v) | Steam power, MWe | | | 97 | | | | |
| (u) | 3 stage compression of N2/CO2, Item 461, MWe | | | 79.4 | | | | |
| (s) | Power from N2 Expansion, Item 4913, MWe | | | 53.7 | | | | |
| (t) | water flow, Item 4611: lb/hr | | | 2,820,000 | Pump, MW | 5.16 | | |

To burn the char for boiler 441, an air cooled, slagging combustor 44 replaces the existing coal burners on the boiler 441, except in certain boilers, such as those designed by Babcock & Wilcox that use slagging combustors, or those designed by Foster-Wheeler that are designed for use with high carbon, high ash coals. For this PA coal and assuming a typical heat rate of 10,000 BtulkWh for this 100 MWe steam plant, the coal consumption would be 82,000 lb/hr, based on the 13,160 Btu/lb Higher Heating Value (HHV). However, in the present configuration where only char 4410 is fired into the boiler 441, only 76,434 lb/hr of char whose HHV is 14,100 Btu/hr (ignoring the heat required to melt the ash) is needed, (State Point (a) in Table 1 and 4410 in FIG. 4). Combustion air 4411 in FIG. 4 at 874,404 lb/hr, consisting of 203,824 lb/hr of oxygen and 670,580 lb/hr of nitrogen (and ignoring the other air species) is injected next to the coal 4410. To minimize any excess oxygen and nitrogen that must be processed in the exhaust, the stoichiometry will be almost near unity. This is possible because the slagging combustor 44 provides a thermal environment that yields full combustion with little or no excess air. The ash is converted to slag in the combustor and removed through slag tap 4412.

Adding the pyrolysis step to the present system allows the increase in the total coal input to 157,450 lb/hr. As a result, the hydrogen released during the pyrolysis step can fuel a modern combined cycle plant whose overall efficiency is estimated conservatively at 40% for descriptive purpose of this invention. The net results are that even with the internal plant power required to implement the pyrolysis and carbon dioxide sequestration steps, the total net power output of the plant is nearly doubled to 190 MW, from the original 100 MWe. This, of course, sharply reduces the capital cost component of the cost of electricity, and reduces the cost of $CO_2$ sequestration compared to a new power plant.

Before elaborating on the steam plant, the hydrogen production sub-system will be described. It consists of a pyrolizer vessel 43, a calciner 41, a falling sand or alumina pebble bed heater 42, an optional CaO-steam regenerative heater 4151, a cyclone separator 4351, a hydrogen generator 431 and a sand filter 432, all shown in FIG. 4.

During operation, the calciner vessel 41 is filled with pulverized limestone 411 at State Point (b) a rate of 240,112 lb/hr and an initial particle temperature of 1292° F. (700° C.) where the equilibrium pressure of $CO_2$ is only 25.3 mm of Hg. The size of the vessel 41 is controlled by the calcination rate, which requires heating the $CaCO_3$ (limestone) to about 1700° F. (927° C.) where the pressure of $CO_2$ is somewhat greater than 1 atmosphere. A heat input of 902 Btu/lb of $CaCO_3$ is used for its heatup from the inlet particle temperature to the total calcination temperature and for its calcination. The smaller the particle size, the greater its porosity, and the higher the gas temperature, the more rapid is the rate of calcination. Extensive studies from commercial limestone kilns show that to implement calcination of a limestone kiln within 1 hour requires gas temperatures above 2000° F. However, as the particle temperature increases much above this level, there is a substantial risk of "dead-burning" in which the particle surface melts and the internal pore structure closes, which prevents its interior from calcining. Therefore, the dimensions and volume of the calcining vessel should be determined so that substantially the entire internal surface of the calcined particle is available for efficient application to the hydrogen production step. This may easily be performed by those of skill in the art.

The limestone 411 collected in the hydrogen production vessel 431 is conveyed pneumatically to the top of the calcining vessel 41 and drops into the vessel through a rotary valve 4119. The heat of calcination is provided by combustion of 15,360 lb/hr of char 4121 that is removed from the bottom of the pyrolizer vessel 43, with the char 4121 at about 1500° F., and conveyed pneumatically to an air-cooled, slagging combustor 4112. The combustion air 4122 in FIG. 4 at State Point (c) at a rate of 174,455 lb/hr that is pre-heated to 1700° F. by the gas exhaust from the falling particle heater 42 may be mixed with some of the gases extracted from the calciner exhaust gas 416 in order to limit the combustor gas exit temperature to a point where rapid calcination occurs but not so hot as to result in "deadburning" of the $CaCO_3$. The combustor gas exhaust 416 flows upward from the bottom of the calciner 41 to the top with sufficient pressure above 1 atmosphere to slightly fluidize the particles.

The CaO particles 414 are extracted at a particle temperature of 1700° F. through rotary valve 4118 at State Point (d) at a rate of 134,478 lb/hr and conveyed pneumatically with steam 415, at a rate of 6724 lb/hr. The steam is extracted at 570° F. and 150 psig from the steam turbine 442 at bleed point 4422, State Point (g), to the hydrogen reaction vessel 431.

However, FIG. 4 shows an alternate scenario for this steam 4422 in case it is desired to increase the hydrogen reaction temperature to accelerate the reaction rate. In this case, the steam temperature entering the hydrogen reaction vessel is increased in two steps. In step one, the CaO particles are deposited in vessel 4151 through which flows the steam 4422 that is extracted from the steam turbine 442 bleed point at a rate of 86,440 lb/hour and 150 psi, 570° F., and reheated in tube section 4412 in the boiler 441 to 1000° F., 150 psig steam, State Point (f). The CaO transfers 12.7 MMBtu/hr to the steam and heats it while the CaO is cooled to 1270° F. at the outlet 414 of vessel 4151 State Point (dd), and flows into the hydrogen reaction cyclone chamber 431, which said reaction following equation (2). If additional heat is necessary the steam may be further heated to 1500° F., which matches the pyrolysis gas outlet temperature, by attaching a natural gas burner 4155 to vessel 4151. The added heat needed for this second step, State Point (h), is 10.6 MMBtu/hr, which is provided by 493 lb/hr of methane and burned with 1970 lb/hr of oxygen. Oxygen is used to prevent nitrogen from mixing with the hydrogen gas. This second step produces an additional 1356 lb/hr of $CO_2$, which is reacted by calcining additional $CaCO_3$. However, in some embodiments, this entire two-step steam heating procedure may be avoided, for two reasons. First, the reaction should have enough energy to produce hydrogen at a temperature above 500° C. (931° F.), and, therefore, additional heating of the steam is not warranted. Second, the final CaO particle temperatures leaving hydrogen reaction vessel 431 would typically be below 1290° F to minimize any re-emission of $CO_2$ into the gas phase.

Returning to the calciner 41, the hot combustion gases 416, State Point (i), exit near the top of the calciner at a rate of 161,954 lb/hr of $CO_2$ derived from calcination and from the combustor 4112 and 134,761 lb/hr of $N_2$ also from the combustor. These gases are at 1725° F. Note that oxygen is not typically used in embodiments of the invention. The gas stream is split into two streams. One gas stream 4161 of 173,992 lb/hr and 1725° F., State Point (ii), enters at the bottom of the top chamber of the two chamber, falling solids heat exchanger, where it heats either sand or small alumina particles 421 and exists near the top of the upper chamber at a temperature of 130° F., State Point (iii). This cold stream 4161 flows to the $N_2/CO_2$ separation sub-system for ultimate sequestration of the $CO_2$ underground.

The heated particles drop through a rotary valve 4218 into the lower bed where they heat the combustion air 4122, State Point (iv), entering the bottom of vessel 42, and are heated in the calciner 4112 to 1700° F. The cold particles 421 are then pneumatically recycled to top of vessel 42 using $CO_2$ drawn from exhaust flow 4161 and pressurized in a blower 4211 to about 10 psig.

If cost is more important than efficiency, this entire step of using vessel 42 can be eliminated.

The second stream 4162 of 122,723 lb/hr of $CO_2/N_2$, also at 1725° F., State Point (jj), is further heated to 1932° F. by means of a natural gas burner 4310 that adds an additional 14.2 MMBtu/hr from 659 lb/hr of natural gas 43111 fired with 11,291 lb/hr of air 43112, State Point (j). The combined flow 4164 of 134,673 lb/hr and 1932° F., State Point (jjj), enters the pyrolizer vessel 43 through a vertical tube bundle placed inside the vessel 43. A total of 1931, Schedule 40, 1-inch Inconel 800H pipes, 12 ft long, indicated by reference numeral 439 in FIG. 4, transfer heat to the coal to 1500° F., where essentially all the volatile matter of the coal is released into the gas phase. The gases 4164 enter the pipes at a temperature of 1932° F., and exit at 130° F., State Point (k), which is sufficient to heat the crushed or coarsely pulverized coal 430 (about 50% passing through 100 mesh), which is introduced at a rate of 157,450 lb/hr, State Point (z), through the top of the vessel through either a rotary valve or a lock hopper 434. The coal is heated through the pipe walls from ambient to 1500° F., which, as shown in FIG. 3 should release the volatile matter from the coal.

The primary reason for limiting the pyrolysis to the volatile matter is the desire to limit the peak gas temperature in this process. With a peak $N_2/CO_2$ temperature of 1932° F., and a peak volatiles gas temperature of 1500° F., the peak metal temperature will be about 1716° F., which is attainable with high temperature alloys such as Inconel 800H. This material could be used in the high temperature section of the heat transfer pipes, while stainless steel or another similar material may be used in the lower temperature section. If, on the other hand, a higher gas temperature for coal devolatilization, such as gasification of char with steam, were selected, then high-temperature materials, such as silicon carbide, would be needed.

To eliminate the substantial power needed to compress the 7715 lb/hr of hydrogen that is released by the coal devolatilization and the additional 9593 lb/hr of hydrogen that is released in vessel 431 by reaction in equation 2, part of the 150 psig steam flow 4422 is diverted into the coal side of the pyrolizer vessel in order to pressurize the volatile matter. The rotary valve or lock hopper 433 is therefore also required at the bottom of the pyrolizer to allow removal of the char 4312, State Point (w), which is conveyed by air from blower 4331 partly to the calciner combustor 4112 at the rate of 15,360 lb/hr, 4121, and the balance, 76,434 lb/hr, 4410, to the combustor 44 attached to the boiler 441.

The gas stream 4164 of $CO_2$ and $N_2$, 132,992 lb/hr, and 1681 lb/hr water, leaving the pyrolizer 43 at 130° F., State Point (k) flows to stream 4512, State Point (l), to the gas separator and $CO_2$ sequestration sub-system which has a total flow of 143,423 lb/hr of $CO_2$ and $N_2$ each.

The devolatilized gas, liquid, and elutriated solids exit near the top of the pyrolizer into a cyclone 4351 that separates the solids and larger liquid droplets 435 and returns them to the pyrolizer. The gas stream 4311, State Point (m), consisting of 7715 lb/hr of $H_2$ and 28,281 lb/hr of carbon at 1500° F. and 150 psig. They are listed as elements, although both species may be mixed with more complex hydrocarbons. This $H_2$ and C join the 86,440 lb/hr, 1000° F., 150 psig steam flow 4422, (or 87,549 lb/hr of steam and 1356 lb/hr of $CO_2$ if vessel 4151 and burner 4155 are used), and the solid CaO particles stream 414 of 134,478 lb/hr stream in vessel 431 where these reactants by equation 2 are converted to 240,112 lb/hr of $CaCO3$, State Point (b), which are pneumatically transported back as stream 411 to the calciner 41. A total of 17,308 lb/hr of hydrogen at 150 psig, 4320 in FIG. 4, State Point (y), is transported to filter 432. The filter 432 is filled with sand 4321 which will remove any solids and liquids that may have escaped the hydrogen production vessel 431. Depending on the effectiveness of this sand filter 432, it may be necessary to place another ceramic filter downstream to catch any residual carryover in the hydrogen.

The hydrogen is used to fuel a gas/steam turbine combined cycle power plant 4322, which at a conservative 40% overall efficiency will generate 124 MWe, State Point (x). Alternatively, the hydrogen can be sold as a fuel or feedstock, either as a compressed gas or as a metal hydride, or similar hydrogen retention component, shown as 4323 in FIG. 4.

Periodically, the sand on the bottom of the filter 432 is removed as stream 4321 and injected in the slagging combustor 44 with the coal 4410 and converted to liquid slag and removed with the slag 4412 from the combustor. The 150 psi pressure at which the hydrogen is produced was selected to allow its direct injection into a gas turbine combustor.

Returning to the original 100 MW boiler, part of the pollutant concentrations of $SO_2$, $NO_x$, dioxin/furans, and volatile trace metals are removed during combustion in the combustor 44. The balance of the $SO_2$, $NO_x$, is removed in the boiler furnace 441 by injection of reagents at 4415 downstream of the combustion gas entry into the boiler. The balance of dioxin/furans and volatile trace metals, especially mercury, are removed by water droplet spray 4414 injection in the exhaust duct of said boiler where said spray is sufficient to lower temperature of the $CO_2/N_2$ gas stream to somewhat below the 100° F. range. Water spray 4414 may also contain activated carbon to remove any residual of trace pollutants. All these pollution removal processes and their mode of operation are described in the patents that were listed and incorporated by reference above.

The steam generated in the boiler 4421 flows into steam turbine 442 at 1000° F., where 86,440 lb/hr of steam is bled from the turbine at 150 psig and 570° F. in stream 4422. A small part of this steam 415 is diverted to convey the CaO particles leaving calciner 41, as explained above. The first stream is reheated in reheater 4412 in the boiler to 1000° F. and sent to the pyrolizer 43 and hydrogen generator 431, as explained above. The gross electric power output of the steam turbine-electric generator 443 is 104.2 MWe, and a charge of 7 MWe is taken for the bleed steam, resulting in a net output of 97 MW, State Point (v).

The residual gas stream of $CO_2$ and $N_2$, whose temperature is below 100° F., passes through a baghouse 451 where any residual particles are removed. The stream 4511, State Point (n), consisting of 280,258 lb/hr of $CO_2$ mixed with 670,580 lb/hr of $N_2$ is then joined with stream 4512, State Point (1), to yield a gas mixture of 444,000 lb/hr of $CO_2$ and 814,000 lb/hr of $N_2$. Although not shown, it is assumed that the pollutants in the volatile mater, such as organic sulfur, are removed by reaction with the CaO, and, as such, part of the limestone at the bottom of calciner 41, which would contain small quantities of calcium sulfate formed by reaction of sulfur dioxide with said CaO, will be removed periodically and disposed of in a landfill. Alternatively, it could be injected into combustor 44 in the same manner as the sand 4321 to liquefy the solid and encapsulate the sulfur in the slag.

The $CO_2/N_2$ mixture comprising streams 4511 and 4512 is compressed in a three-stage compressor 461 to 1000 psi, with intercooling of the gases back to near ambient after each compression stage. This requires a total 79.4 MW, State Point (u). As described above, $2.82 \times 10^6$ lb/hr of water 4611, State Point (t) is injected into this gas mixture in order to dissolve the $CO_2$ in the water and form $H_2CO_3$. To compress this water to 1000 psi will require 5.16 MWe, assuming a 70% mechanical efficiency of pump 4610. This allows separation of the $N_2$ from the liquid in separator 4612 and expansion of the compressed 1000 psi nitrogen through a gas turbine 491 to generate 53.7 MW in a generator 4913 of electricity while the nitrogen 4912 is exhausted to the atmosphere, which is the reason why all pollutants were removed in the combustor and boiler.

The liquid water-hydrogen carbonate solution 4811 is pumped through the ground 481 in a nominally 2150 foot deep pipe into limestone deposits 4812, or such depths that have deposits, where the solution will react with the $CaCO_3$ to form Ca $(H_2CO_3)_2$ solutions. Depending on the geology of this underground disposal site, it may be possible to recover part or most of the water that was injected in excess of that needed to form the solution, or over 80% of the water used if the calcium compound liquid separates from the water. In this case, the water consumption requirements would decrease sharply.

In summary, this plant produces 221 MW of gross power, consisting of 97 MW from the steam plant, and 124 MW from the gas turbine plant. Of this amount 31 MWe are consumed inside the power plant as parasitic power, of which water pumping consumes 5.16 MW, compression of $CO_2$ requires 19.7 MW, and the differential between compression and expansion of the $N_2$ consumes 6 MW net. The net parasitic power loss is 14% loss of the total power, almost all of which is for $CO_2$ sequestration. The net power output is 190 MW, which is almost double the original 100 MW output of this plant.

Example of Hydrogen Production from Biomass as Applied to a U.S. Corn Field

To explain the application of agricultural crop residue to hydrogen production, an example will be selected based on the average size of a farm in the U.S.A. corn-belt, such as Nebraska, namely 1000 acres. According to available data, a 1000 acre farm produces 2240 short tons of residue a season that could be conservatively sold by the farmer without adverse effects of the field's fertility. Assuming a 10-hour work day and a 60-day corn harvesting season, by way of example, and noting that any other harvest schedule can be assumed, and a HHV of 6444 Btu/lb for sun dried residue, one obtains a heating content of about 56 MMBtu/hr. Note that all crop residues have heating values in this range, and the values selected for this example are for sugarcane bagasse. The corresponding value for corn are similar with the exception that sugarcane has a higher mineral ash content. The bagasse values are:

Proximate: Volatile-73.78% (by weight), Fixed carbon-14.95%, ash-11.27%.

Ultimate: C-44.80%, H-5.35%, O-39.55%, N-0.35%, S-0.01%, Ash-9.91, HHV-7,444 Btu/lb.

Note that the HHV cited is 78% of that obtained when multiplying the HHV of 14,100 Btu/lb for coal and 61,000 Btu/lb for $H_2$. The entire difference can be explained by noting that the oxygen in the fuel, which is always very high in biomass, may be in the form of $CO_2$ and $H_2O$, which, of course, are not available as fuels. For simplicity, it is assumed 22% of the carbon and hydrogen are equally bound in $CO_2$ and $H_2$. Also, as noted, it is assumed that corn residue has the same composition as bagasse.

The entire hydrogen production plant is assumed to be located within a short enough distance from the harvested fields so as to make residue transportation costs minimal. Furthermore, the hydrogen production plant is assumed to be quasi-portable, so that it can be moved seasonally from harvest location to harvest location as the various crops, in addition to corn, including wheat, rice, etc. are harvested. This quasi-portability will be a primary factor is selecting the size and capacity of the hydrogen production plant.

For the present 1000-acre corn farm example, with its 600-hour harvest cycle, the shredded corn residue fed into the pyrolizer 43 in FIG. 4 at 7,463 lb/hour, based on a 56 MMBtu hourly heat input. (In the present hydrogen production application, the entire $CO_2$ separation and sequestration sub-system in FIG. 4 are not used.) Also, the small plant size will not warrant the use of a steam turbine, and instead diesel engine-electric generators, preferably fueled by hydrogen, would be used.) Based on the 22% reduction in available carbon and hydrogen fuel value, the net volatile matter of carbon is 20% by weight, (namely, 0.78×44.80% [V.M. carbon]-14.9% [fixed carbon]). This quantity of carbon requires 6,944 lb/hr of CaO and 4,464 lb/hr of steam. This produces 496 lb/hr of hydrogen and results in the formation of 12,400 lb/hr of $CaCO_3$, which is transported to the calciner vessel 41 in FIG. 4.

As noted above, based on data on biomass pyrolysis and gasification, the biomass is heated to a peak temperature of 850° C. (1562° F.), which, assuming a specific heat of 0.3 Btu/(lb-° F.), requires 3.33 MMBtu/hr to heat the 7,463 lb/hr of biomass to that temperature. Calcining the 12,400 lb/hr of $CaCO_3$, assuming its temperature leaving the hydrogen production vessel 431 in FIG. 4 is at 1269° F. and its outlet temperature at 414 the bottom of calciner 41 is 1700° F., requires 11.18 MMBtu/hr.

The total fixed carbon 4312 leaving the pyrolizer at the bottom of vessel 43 is 1112 lb/hr, whose heat content based on the HHV of 14,100 for carbon, is 15.67 MMBtu/hr. As was the case with coal, the char containing the fixed carbon is used to calcine the $CaCO_3$ in a slagging combustor 411 of FIG. 4 at a rate of 792 lbs of carbon to produce the requisite 11.18 MMBtu/hr.

A large energy sink in the system is from compression of hydrogen. In the coal case, the steam bled from the turbine 442 in FIG. 4 was used to alleviate this problem by operating at 150 psi. The use of steam to produce the high pressure sharply reduces the compression power needed compared to pressurizing gaseous hydrogen. In the present embodiment, hydrogen is the desired end product and its primary market will be transportation, which requires high energy storage density for practical use. Current R&D on fuel cell driven cars uses special cylinders filled with hydrogen at 5000-psig. This pressure is most probably excessive for a steam boiler. Therefore, to avoid expensive materials, a small water-tube boiler for the present application should use less costly materials with a peak temperature of about 800° F. and operating at 1000 psig pressure. The combustor for this boiler is of similar design as the slagging combustor for coal in FIG. 2. As this is a very small boiler, it should be economical to operate the feedwater with the combustion gas exhaust to a relatively high feedwater temperature. The enthalpy of saturated water at 500 psig and 467° F. is 449 Btu/lb. This yields a net input water-steam enthalpy of 940 Btu/lb, (1389–449 Btu/lb), and assuming 80% boiler efficiency, the fuel input is 5.25 MMBtu/hr for 4,464 lb/hr of steam. This requires 372 lb/hr of carbon.

Therefore, the sub-total heat input is 3.33 MMBtu/hr for pyrolysis, 11.18 MMBtu/hr for calcination and 5.25 MMBtu/hr for steam production, for a total of 19.76 MMBtu/hr, and the total fixed carbon required is 1401 lb/hr, while the fixed carbon available of 15.67 MMBtu/hr from the harvest, is only 1,112 lb/hr, a deficit of 4.09 MMBtu/hr, equal to 289 lb/hr of carbon fuel.

However, the combustion of 792 lb/hr of fixed carbon in air in the calciner's combustor 411 in FIG. 4 yields 2,904 lb/hr of $CO_2$ from combustion and 5,456 lb/hr of $CO_2$ from calcination, both at a gas temperature of about 1725° F. In addition, the nitrogen in the air of 6,948 lb/hr is also heated to this temperature. This energy can be transferred to the combustion air using a shell and tube heat exchanger in place of the falling sand heat exchanger, 42 in FIG. 4 as well as heating the biomass in the pyrolizer through the metal pipes 439 in FIG. 4. As in the case of coal, the $CO_2$ and $N_2$ mixture is expanded to about 130° F. and released to the atmosphere, because, as biomass, the $CO_2$ does not add to the net $CO_2$ in the atmosphere. Of this available heat of 6.65 MMBtu/hr, 3.85 MMBtu/hr is applied to pre-heat the combustion air to 1700° F., leaving 2.8 MMBtu/hr for pyrolysis. Consequently the net additional heat input required beyond that available from the fixed carbon is reduced to 1.29 MMBtu/hr, (i.e. 19.76–15.67–2.8=1.29 MMBtu/hr).

After mixing of the biomass volatiles, the calcium oxide, and steam in the hydrogen producing reactor 431 in FIG. 4 the reacted CaCO.sub.3 drops through a lock hopper and is pneumatically conveyed at a slightly above atmospheric pressure to the top of the calciner vessel 41 for re-calcination therein. The hydrogen passes through the sand filter 432, which now incorporates a cooler for removal of any liquids or solids prior to entering the components 4323 in FIG. 4 (not shown in detail as this is well known equipment) for processing the hydrogen for shipment. The gas is cooled to ambient temperature and compressed to 5000 psig or more depending on the vessel technology with a multi-stage compressor and intercooling and stored in high pressure shipping cylinders. The sand 4321 at the bottom of the sand filter is removed for cleaning or disposal or injection into the combustor 411 for recovery of the energy of the organic compounds mixed in with the sand.

There are two other heat sinks in this system. One is the $CO_2$ that is presumed to be trapped in the biomass as a result of reaction with its high internal $O_2$ concentration. Based on the difference between the carbon measured in the ultimate analysis, 44.8%, and the 39.94% carbon deduced from the measured HHV, this difference is 4.86%. Applied to the 7,463 lb/hr of fuel consumed, this difference yields 362 lb/hr of carbon, which equal to 1330 lb/hr of $CO_2$ in the biomass. This $CO_2$ would be mixed with the hydrogen that would exit from the hydrogen production vessel 431 in FIG. 4, and would be removed. One way of removing this $CO_2$ is to react it with CaO, which involves calcining 3,022 lb/hr of additional $CaCO_3$ at a gross thermal input of 2.73 MMBtu/hr.

Separating part of the volatile carbon bound in the fuel and co-firing it with the fixed carbon in combustor 411 in FIG. 4 could provide this additional thermal input. This requires an iterative calculation. Instead, since the present objective is to show the benefit of hydrogen production from biomass, it is assumed that the hydrogen will be co-fired with the fixed carbon in combustor 411 to provide the extra needed energy. Consequently, a total of 4.02 MMBtu/hr, (the sum of 1.29 MMBtu/hr from the primary hydrogen production step plus 2.73 MMBtu/hr for the calcination) will be required to capture the $CO_2$ in the fuel. This will require a gross 79 lb/hr of $H_2$ using the LHV of 51,000 Btu/lb, with the $H_2O$ product exhausted as a vapor. As with the $CO_2/N_2$ products of combustion, the products of hydrogen combustion in air as well as the $CO_2$ energy from calcination can be used for preheating the combustion air and reducing the calcining energy. This will reduce the extra heat input required to only 2.84 MMBtu/hr, which requires only 56 lb/hr of $H_2$.

This process produces 807 lb/hr of hydrogen consisting 406 lb/hr from direct hydrogen production and 311 lb/hr from the net available hydrogen in the biomass. This is reduced to 751 lb/hr, or by 7%, to account for the additional energy deficit in the fixed carbon. If this hydrogen were used in a fuel cell where the end product is liquid water, its heat content would be 45.8 MMBtu/hr, namely 751 lb/h×61,000 Btu/lb, or 0.82% of the original heating value of the biomass. If the hydrogen were to be used in a reciprocating engine, as advocated by one car manufacturer, then the lower heating value should be used, 51,000 lb/hr, for a total of 38.3 MMBtu/hr or 68% of the original fuel heat content of the biomass.

If the hydrogen is to be stored compactly, for example, so that it may be used as an automobile fuel, the final energy sink would be the one required to compress the hydrogen to at least 5000 psi, or whatever other pressure is necessary, in order to provide a sufficiently compact energy storage volume for automobiles to give them a range of about 250 miles per tank. Pressures up to 10000 psi may be used in these applications.

In embodiments of the invention, pressurized steam from a steam turbine may provide the first 1000 psi of compression for hydrogen storage, which consumes only about 4 kW of water pump power. However, compressing the hydrogen from 1000 psi to 5000 psi in a 3-stage compressor at 80% efficiency with intercooling consumes 249 kW. Assuming a 30% overall thermodynamic efficiency diesel engine driven 3-stage compressor, the process will require 0.94 MMBtu/hr heat input, or an additional 55 lb/hr of hydrogen fuel, which equals 7.3% of the 751 lb/hr net $H_2$, leaving 696 lb/hr for sale, or 35.5 MMBtu/hr based on LHV.

Now, if a more optimistic assumption of 2500 psig provided by steam pressure were used, the 148 kW of 2-stage compressor power, equal to 33 lb/hr of $H_2$, or only 4.4% of the 751 lb/hr net $H_2$, would be required. This leaves 718 lb/hr for sale, with 36.6 MMBtu/hr LHV.

In biomass methods according to the invention, valves will be used for introducing the biomass and removing the char from the pyrolizer. Lock hoppers in place of valves 433 and 434 in the pyrolizer vessel 43 of FIG. 4 would be suitable. Rotary valves may also be used, but rotary valves could possibly leak, reducing their effectiveness.

The economic benefits to the owners of the agricultural biomass in methods according to the invention are clear. In early April 2003, a bushel of corn weighing 56 pounds traded in the commodity market at $2.40/bushel. By February 2004, the price had increased to $2.80/bushel. The 7,463 lb/hr of biomass in the present example equates to 133 bushels worth of biomass.

Moreover, with respect to hydrogen production and its use as a fuel, the wholesale price of gasoline was $0.70/gallon, about $4.7/MMBtu, in April 2003, and $1/gallon, or $6.70/MMBtu in February 2004. Assuming that the compressed hydrogen wholesale price is about two-thirds that of gasoline, the 35.5 MMBtu/hr hydrogen heating value equals $106.5/hr and $152/hr for the two periods respectively. This equals to a 133-bushel hourly firing rate, which translates to $0.80/bushel and $1.14/bu., respectively. This equals 33% and 40% of the price of corn, respectively.

In addition, if carbon dioxide emission credits trade for $30/ton, the 4.18 tons per hour reduced by this hydrogen production process, equals $125/hr, or $0.94 per bushel. This adds 39% and 34% to the price of corn in April 2003 and February 2004. The combined price of $1.74 per bushel and $2.08/bushel equals 73% to the price of corn.

As will be recognized by those skilled in the art, the above-described process operates at high pressures to achieve maximum conversion efficiency. An alternative process that would avoid such high pressures would be to operate the steps of pyrolyzing through hydrogen production and cleaning steps at low pressures, either at the 147 psig proposed for coal or even at one atmosphere pressure, if the reactions are rapid enough. This alternative is feasible if the hydrogen end product is to be stored as a metal hydride, such as magnesium hydride, or in special carbon tubes that are now being developed by researchers. Therefore, high pressures need not be a barrier to implementation of hydrogen production processes according to the invention.

Increasing the Power Output of an Existing Coal Fired Power Plant

The key advantage of the air-cooled slagging combustor is ability to efficiently burn char, which has no volatile matter. Char firing is not feasibly in most existing pulverized coal fired power plant boilers. Since permitting for new Greenfield coal fired power plants is a difficult, costly and very lengthy process, it is advantageous to practice the current invention in which the capacity of the existing power plant is doubled by firing the existing boiler with char at the same heat input as its original coal fired operation. However, instead of producing hydrogen from the volatile matter in the coal, the pyrolizer simply generates carbon-hydrogen gas. The pyrolizer is heated either directly with a char and compressed air, nominally at 150 psig, in one of more pressurized air-cooled slagging combustors, in which case the result would be a gas diluted with nitrogen, or preferably it is heated and pressurized directly with steam, and indirectly through pipes inserted in the pyrolizer vessel, as in the hydrogen production method. Referring to FIG. 4, this method, retains pyrolizer vessel 43, particle separator 4351, particle filter 432, and associate components. The pyrolysis gas fires the combined cycle power plant 4322. The calciner 41, heat exchanger 42, hydrogen generator 431 and associated equipment are removed. All the pollution removal processes identified in this invention, including for $SO_2$, $NO_x$, volatile trace metals, dioxins/furans are retained. Also in this application the carbon dioxide is not separated and sequestered. The advantage of this approach is that it would allow the power plant to immediately expand power production, while at the same time allowing for future convention to hydrogen production and future carbon dioxide sequestration. The future benefit will undoubtedly accelerate the necessary permitting. In this sense this method is another intermediate step toward future of total removal $CO_2$ removal. It is to be emphasized this is not a conventional coal gasification power plant, where all the coal is gasified. In this invention only low temperature devolatilization is used, which is made possibly by the ability of slagging combustors to fire char, such as B&W cyclone fired boilers or the air-cooled, slagging combustor.

While the invention has been described in terms of certain exemplary embodiments, those skilled in the art will recognize that the invention can be practiced with modifications within the sprit and scope of the appended claims.

What is claimed is:

1. A method for incrementally reducing, and subsequently eliminating by sequestration, the emissions of carbon dioxide from the combustion of solid fossil fuels, in energy systems that contain components including one or more of furnaces, boilers, and heat engines, comprising:

pyrolyzing of volatile matter in the solid fuels and converting it to hydrogen by reaction with calcined limestone; and eliminating one or more other gaseous species selected from the group consisting of nitrogen oxides, sulfur oxides, volatile trace metals, mercury, and dioxins and furans that are emitted during the combustion of solid char fuel in said energy systems; and leaving carbon dioxide to be sequestered and nitrogen to be released to atmosphere.

2. The method of claim 1, further comprising:

operating a primary combustor or boiler under fuel rich conditions to reduce NOx emissions by combustion at a sub-stoichiometric ratio in the range of 0.60 to 0.8, causing or allowing up to nominally 20% of the carbon in the solid fossil fuel to remain unburned;

collecting the unburned carbon with fly ash upstream of a stack for storage either at the original combustion site for future combustion of the unburned carbon and sequestration of the carbon dioxide or for shipping to a site suitable for underground sequestration after the combustion, thereby reducing carbon dioxide emissions to the atmosphere; and combusting the unburned carbon in systems equipped with carbon dioxide sequestration methods.

3. The method of claim 2, further comprising selling unneeded NOx emission rights that result from operating at fuel rich conditions.

4. The method of claim 1, wherein the solid fossil fuel is coal and the carbon dioxide sequestration is preceded by a series of steps comprising:

pyrolyzing said coal at a nominal temperature sufficient to evolve gaseous volatile matter at about 1500° F. in a pyrolyzing vessel that is pressurized with steam that is bled from a power plant's steam turbine at a nominal pressure of about 150 psi;

heating said coal in said pyrolyzing vessel directly using said steam and indirectly using carbon dioxide and nitrogen that evolve from calcination of calcium carbonate and flow through pipes that are embedded in said pyrolyzing vessel;

mixing said gaseous volatile matter in a hydrogen production vessel with additional steam bled from said turbine and, optionally, further heating said gaseous volatile matter and said additional steam with effluent of an oxygen fired natural gas combustor;

mixing said gaseous volatile matter in said hydrogen production vessel with calcium oxide particles drawn from a calciner vessel at a temperature that converts the mixture to hydrogen gas, leaving calcium carbonate particles;

cleaning said hydrogen gas in a sand filled vessel or other hot gas cleanup device, followed by one of firing said hydrogen gas with air in a combined gas-steam turbine power plant and processing said hydrogen gas for sale as a transportation fuel or chemical feedstock;

pneumatically recirculating said calcium carbonate particles to said calciner vessel, such that energy for recalcination is supplied from a slagging combustor that is fired directly with a fraction of residual char removed from said pyrolyzing vessel and with air that is preheated with the above atmospheric pressure nitrogen and carbon dioxide effluent from said calciner vessel flowing through a falling solid particle bed regenerative heat exchanger;

firing the residual char removed from said pyrolyzer vessel in one or more slagging combustors that are attached to either one or more new boilers or retrofitted to one or more existing coal fired boilers that are modified with said slagging combustors, said residual char having an energy content about equal to an energy content of the coal that would have been fired in an unmodified boiler;

processing combustion products from said char heated boiler within a combustion zone in each slagging combustor of the slagging combustors and in a post-combustion zone of said boiler to which said slagging combustors are attached thereto to remove one or more pollutants selected from the group consisting of nitrogen oxides, sulfur dioxides, hydrogen chlorides, dioxins, furans and volatile trace metal that are not retained in slag removed from said slagging combustor, leaving carbon dioxide and nitrogen in an exhaust duct upstream of ash particle collectors, mixing the carbon dioxide and nitrogen in said exhaust duct with the carbon dioxide and nitrogen that are removed from said hydrogen production vessel, spraying water droplets into the exhausted duct containing the mixed carbon dioxide and nitrogen to cool them to ambient temperature, compressing said carbon dioxide and nitrogen with compressor intercooling to retain the ambient temperature and mixing the two gases with water at equal pressure such that the carbon dioxide remains absorbed in pressurized water at a pressure suitable for sequestration with natural underground calcium carbonate formations in a form of solid calcium hydrogen carbonate, expanding the nitrogen of the mixed carbon dioxide and nitrogen solution through a turbine to recover compression energy, wherein, optionally, the hydrogen withdrawn from said hydrogen production vessel is used for on site power generation, as a transportation fuel, or as a chemical feedstock.

5. The method of claim 1, further comprising using renewable agricultural residue or forest product waste to produce hydrogen in systems of about 1 to 20 megawatt electric power output, said systems being quasi-portable to allow their relocation to different regions during crop or tree harvest periods, wherein hydrogen produced by said agricultural residue or forest product waste is sold as a transportation fuel or as chemical feedstock, and residual char is shipped to regional power plants.

6. The method of claim 2, further comprising:

collecting unburned carbon from products of the combustion for later combustion; combusting the unburned carbon; and sequestering carbon dioxide produced by the combusting suitable for a storage site of the unburned carbon.

7. The method of claim 6, further comprising: processing the combustion products from a char heated boiler within a combustion zone in slagging combustors and in a post-combustion zone of a boiler to which said slagging combustors are attached thereto to remove one or more pollutants selected from the group consisting of nitrogen oxides, sulfur dioxides, hydrogen chlorides, dioxins, furans and volatile trace metal that are not retained in slag removed from said slagging combustors; further cooling said carbon dioxide and nitrogen gas mixture to ambient conditions by spraying water droplets into an exhaust duct of said boiler upstream of a particle collection equipment, and compressing carbon dioxide and nitrogen effluent stream from a mixing thereof to a pressure suitable for subterranean sequestration; mixing the compressed carbon dioxide and nitrogen effluent stream from said compressing step with an amount of water to form an aqueous solution containing dissolved carbon dioxide; separating the nitrogen gas from the carbon dioxide and nitrogen effluent stream of said compressing step from the aqueous solution containing dissolved carbon dioxide and expanding the nitrogen gas through a turbine to recover at least a portion of energy used in said compressing step; and sequestering the solution containing carbon dioxide by placing it at a subterranean depth.

8. The method of claim 7 wherein the solid fuel is coal.

9. The method of claim 7, wherein the aqueous solution containing carbon dioxide reacts with subterranean limestone during the sequestering step.

10. The method of claim 4, wherein, in power plants located in region having inadequate water supplies for forming dissolved carbon dioxide solutions, said sequestering step comprises: injecting heated calcium oxide particles into char fired boiler gases whose temperature is about 700° C. to react with the carbon dioxide to form calcium carbonate; calcining said calcium carbonate in a separate calcining vessel that is fired with char in at least one of the slagging combustors to evolve gaseous carbon dioxide; compressing cooled gaseous carbon dioxide; and injecting the compressed carbon dioxide into a geologic formation, a spent gas well, or a saline formation.

11. The method of claim 7, wherein, in power plants in regions having inadequate water supplies for forming dissolved carbon dioxide solutions said sequestering step comprises: injecting heated calcium oxide particles into said char fired boiler gases whose temperature is about 700° C. to react with the carbon dioxide to form calcium carbonate; calcining the calcium carbonate in a separate calcining vessel that is fired with char in a slagging combustor to evolve gaseous carbon dioxide; compressing the gaseous carbon dioxide; and injecting the compressed carbon dioxide into a geologic formation, a spent gas well, or a saline formation.

12. The method of claim 4, wherein said sequestering step further comprises: causing or allowing the carbon dioxide to mix with underground water to form carbonic acid; and causing or allowing the carbonic acid to mix with underground limestone to form calcium hydrogen carbonate.

13. The method of claim 7, wherein said sequestering step further comprises: causing or allowing the carbon dioxide to mix with underground water to form carbonic acid; and causing or allowing the carbonic acid to mix with underground limestone to form calcium hydrogen carbonate.

14. The method of claim 10, wherein pollutants including at least sulfur dioxide and nitrogen oxide are removed upstream of carbon dioxide removal by reaction with getters, with said removal occurring at gas temperatures above 1700° F.

15. The method of claim 11, wherein pollutants including at least sulfur dioxide and nitrogen oxide are removed upstream of said carbon dioxide removal step by reaction with getters, with said removal occurring at gas temperatures above 1700° F.

16. A method for increasing the electric power output of an existing coal fired power plant by replacing existing pulverized coal fuel with crushed or pulverized char fuel using either existing burners or retrofitting a boiler of the existing coal fired power plant with air-cooled slagging combustors.

17. The method in accordance with claim 16, wherein the volatile matter in the coal fuel is pyrolyzed in one or more pyrolyzing vessels fired with char and compressed air at nominally 150 psig air using one or more, pressurized air-cooled slagging combustors, or heated indirectly through high alloy metal pipes inserted in the pyrolyzing vessels using combustion gases drawn from an existing char fired boiler and directly heated and pressurized with nominally 150 psi steam drawn from a steam turbine of the existing power plant.

18. The method in accordance with claim 17, wherein pyrolysis gas is cleaned in a filter and then utilized to fire a combined gas turbine-steam turbine power plant.

19. A method in accordance with claim 16, wherein the combustion products from said char heated boiler are processed within a combustion zone in each slagging combustor of slagging combustors and in a post-combustion zone of said boiler to which said combustors are attached thereto to remove one or more pollutants selected from the group consisting of nitrogen oxides, sulfur dioxides, hydrogen chlorides, dioxins, furans and volatile trace metal that are not retained in slag removed from said slagging combustors.

20. A method in accordance with claim 16, wherein the existing power plant can be converted in the future to hydrogen production with addition of carbon dioxide separation and sequestration as recited in claim 4.

* * * * *